United States Patent
Xu et al.

(10) Patent No.: US 9,516,561 B2
(45) Date of Patent: Dec. 6, 2016

(54) METHOD AND DEVICE FOR SUPPORTING GROUP HANDOVER

(71) Applicant: Samsung Electronics Co., Ltd., Suwon-si, Gyeonggi-do (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 14/356,099

(22) PCT Filed: Nov. 5, 2012

(86) PCT No.: PCT/KR2012/009241
§ 371 (c)(1),
(2) Date: May 2, 2014

(87) PCT Pub. No.: WO2013/066129
PCT Pub. Date: May 10, 2013

(65) Prior Publication Data
US 2014/0308961 A1    Oct. 16, 2014

(30) Foreign Application Priority Data

Nov. 4, 2011  (CN) .......................... 2011 1 0346105
Jul. 13, 2012  (CN) .......................... 2012 1 0244886

(51) Int. Cl.
*H04W 36/00* (2009.01)
*H04W 40/36* (2009.01)
*H04W 8/18* (2009.01)

(52) U.S. Cl.
CPC ..... *H04W 36/0072* (2013.01); *H04W 36/0055* (2013.01); *H04W 40/36* (2013.01); *H04W 8/186* (2013.01)

(58) Field of Classification Search
CPC ...................... H04W 36/0027; H04W 74/0833
(Continued)

(56) References Cited

U.S. PATENT DOCUMENTS

2009/0047960 A1*  2/2009  Gunnarsson ......... H04J 11/0093
                                                                  455/436
2011/0269464 A1*  11/2011  Xu ..................... H04W 36/0033
                                                                  455/436
(Continued)

FOREIGN PATENT DOCUMENTS

WO     WO 2008044283 A1 *  4/2008 ............ H04W 36/30

OTHER PUBLICATIONS

3GPP TR 36.806 V9.0.0, 3rd Generation Partnership Project; Technical Specification Group Radio Access Network; Evolved Universal Terrestrial Radio Access (E-UTRA); Relay architectures for E-UTRA (LTE-Advanced) (Release 9), Apr. 21, 2010.
(Continued)

*Primary Examiner* — Thomas Lett
(74) *Attorney, Agent, or Firm* — Jefferson IP Law, LLP

(57) ABSTRACT

A method supporting group handover, which is applied to a User Equipment (UE) in communication with a network via a Relay Node (RN), is provided. The method includes a base station (e.g., an S-DeNB) hands over an RN to a base station (e.g., a T-DeNB) and the S-DeNB hands over the UE served by the RN to the T-DeNB, wherein the handovers are performed simultaneously or separately. The various embodiments of the present disclosure provide a base station supporting group handover. The technical scheme set forth in the present disclosure can reduce an unnecessary signaling procedure, the possibility of network congestion, and can reduce the signaling procedure of handover when group handover occurs, so as to reduce the failure of the handover process and enhance the continuity of service.

18 Claims, 11 Drawing Sheets

(58) Field of Classification Search
USPC .......................... 455/436–444; 370/331, 332
See application file for complete search history.

(56) References Cited

U.S. PATENT DOCUMENTS

| | | | | |
|---|---|---|---|---|
| 2012/0231797 A1* | 9/2012 | Van Phan | .......... | H04B 7/15592 |
| | | | | 455/437 |
| 2012/0252355 A1* | 10/2012 | Huang | .............. | H04W 36/0033 |
| | | | | 455/7 |
| 2012/0327841 A1* | 12/2012 | Lee | ....................... | H04W 48/08 |
| | | | | 370/315 |
| 2013/0322325 A1* | 12/2013 | Hahn | ................ | H04W 36/0055 |
| | | | | 370/315 |

OTHER PUBLICATIONS

3GPP TS 36.300 V10.5.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Oct. 3, 2011.

3GPP R3-112553, "Considerations on the scenarios for mobile relay", Oct. 19, 2011, http://www.3gpp.org/ftp/tsg_ran/WG3_lu/TSGR3_73bis/Docs/R3-112553.zip.

3GPP R3-112619, "Handover Procedures for Mobile RN", Oct. 19, 2011, http://www.3gpp.org/ftp/tsg_ran/WG3_lu/TSGR3_73bis/Docs/R3-112619.zip.

* cited by examiner

METHOD AND DEVICE FOR SUPPORTING GROUP HANDOVER

CROSS-REFERENCE TO RELATED APPLICATION(S)

This application is a U.S. National Stage application under 35 U.S.C. §371 of an International application filed on Nov. 5, 2012 and assigned application number PCT/KR2012/009241, which claimed the benefit of Chinese patent applications filed on Nov. 4, 2011 and Jul. 13, 2012 in the Chinese Intellectual Property Office and assigned Serial numbers 201110346105.9 and 201210244886.5 respectively, the entire disclosure of each of which is hereby incorporated by reference.

TECHNICAL FIELD

The present disclosure relates to a mobile communications system. More particularly, the present disclosure relates to a method and device for supporting group handover in a mobile communications system.

BACKGROUND ART

FIG. 1 is a schematic diagram of a Long Term Evolution (LTE) system including supporting Relay Nodes (RN) according to the related art.

Referring to FIG. 1, a wireless resource management entity includes a macro base station (i.e., an evolved Node B (eNB)) 101 and an RN 102. The RN 102 accesses a core network via another macro base station (i.e., Donor eNB (DeNB)) 103. The DeNB 103 is a base station for RN access, wherein eNBs 101 are connected to each other via an X2 interface, and each eNB 101 is respectively connected to a Mobility Management Entity (MME)/Serving Gateway (S-GW) 104 of the core network via an S1 interface. The RN 102 accesses the DeNB 103 via a Un interface. The DeNB 103 provides an X2 proxy function between the RN 102 and another eNB. The DeNB 103 provides an S1 proxy function between the RN 102 and the MME/S-GW 104. The S1 and X2 proxy functions include transmitting User Equipment (UE) dedicated X2 and S1 signaling between the RN 102 and the eNB 101, the RN 102, and the MME 104, and transmitting between the RN 102 and the S-GW 104.

The existing relay is used for a fixed location and does not support motion between different cells. An example of problem now faced by operators is when a user is on a train moving at a high speed. That is, the service quality provided by the existing relay cannot satisfy the operator's demands on the train at a speed of 250-350 kilometers because of detrimental factors such as high noise, high penetration damage, serious Doppler frequency deviation, and lower handover success rate. To address these problems, research is being performed on a mobile relay. The mobile relay is to address the above problems in the exiting relay, improving the quality of the service that can be provided in the high-speed trains and better satisfying user's demands.

There are two kinds of handover processes in the exiting LTE, i.e. S1 handover and X2 handover.

FIG. 2 describes a handover process of an existing UE, taking S1 handover as an example according to the related art.

Referring to FIG. 2, a source eNB 101a sends a handover required message to an MME 104a in operation 201.

The method by which a UE 100 sends a measurement report to the source eNB 101a and the method by which the source eNB 101a initiates a handover may refer to the existing communications protocol.

In operation 202, the MME 104a sends a handover request message to a target eNB 101b.

The source base station S-DeNB refers to an eNB where the UE 100 is initially located, and the target base station T-DeNB refers to an eNB where the UE 100 will be switched to.

In operation 203, the target eNB 101b allocates resource for the UE 100 and sends a handover request acknowledgement message to the MME 104a.

In operation 204, the MME 104a sends a handover command message to the source eNB 101a.

In operation 205, the source eNB 101a sends a Radio Resource Control (RRC) connection re-configuration message to the UE 100.

In operation 206, the UE 100 is synchronized to the target cell and sends an RRC connection re-configuration completion message to the target eNB 101b.

In operation 207, the target eNB 101b sends a handover notify message to the MME 104a.

In operation 208, the MME 104a sends an update bearer request message to a Serving Gateway/Packet Data Network Gateway (S-GW/PDN GW 104b).

The S-GW is mainly used to provide a user plane function and the PDN GW is mainly used to complete functions of billing and lawful interception. The S-GW and the PDN GW may be one entity or two. In this operation, signaling interaction between S-GW and PDN GW is omitted.

In operation 209, the S-GW/PDN GW 104b sends an update bearer response message to the MME 104a.

In operation 210, the UE 100 initiates a Track Area Update (TAU) procedure.

In operation 211, the MME 104a sends a UE context release command message to the source eNB 101a.

In operation 212, the source eNB 101a sends a UE context release completion message to the MME 104a.

It can be seen from the above handover process that each UE needs the interaction of dozens of messages to perform each handover process. The X2 handover process is more optimal than the S1 handover, whereas the RN and the UE both are moving (e.g., on the train) and advancing at a high speed, and if multiple UEs simultaneously perform a handover process, it will lead to an unnecessary waste of resources for the network and will easily lead to a failure of the handover process. In order to address the problem of low handover success rate and improve the efficiency of the handover, the concept of group mobility is set forth. However, there is currently no specific solution about how group mobility is performed.

If an RN and UEs served by the RN simultaneously perform a handover process, a method of ensuring coordinated work is also a problem that cannot be ignored.

In a method provided in the present disclosure, an RN may perform a measurement of a UE and complete a handover process between different cells. Even in this case, there are still two specific problems as described below.

First, when the RN moves from one DeNB to another DeNB (i.e., target DeNB), the MME to which the target DeNB connects may be different from the MME to which the source DeNB connects. So there is a problem of selecting the MME serving the UE, transmitting context information of the UE, and establishing a user plane transmitting path at network side for UE.

Second, there is a problem of letting the UE know of the change of information at the network side, e.g. change of Global Unique Temporary Identifier (GUMMEI) of a new serving MME.

Therefore, it is necessary to provide an effective technical solution to address group movement and group handover.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for supporting User Equipment (UE) group handover, which can ensure that a UE continuously receives data in the environment of high-speed movement, reduce unnecessary signaling procedure, and reduce possibility of network congestion.

In accordance with an aspect of the present disclosure, a method of supporting group handover, which is applied to an UE in a communication system with a network via a Relay Node (RN) is provided. The method includes performing, by a source base station, handover via the RN to a target base station, and performing, by the source base station, handover of the UE served by the RN to the target base station, wherein the handovers are performed simultaneously or separately.

In accordance with another aspect of the present disclosure, a base station for supporting group handover in a communication system is provided. The base station includes a receiving module configured to receive information sent by a RN and a UE served by the RN, a handover module configured to select a target base station to be switched for the RN and the UE served by the RN and to switch the RN to the target base station and the UE served by the RN to the target base station, wherein the handovers are performed simultaneously or separately, and a transmitting module configured to send information to the RN and the UE served by the RN.

In accordance with another aspect of the present disclosure, a method of supporting group handover, which is applied to UE in communications with network via RN is provided. The method includes a base station S-DeNB hands over an RN to a base station T-DeNB, and the S-DeNB hands over the UE served by the RN to the T-DeNB, wherein the handovers are performed simultaneously or separately.

In accordance with another aspect of the present disclosure, a base station supporting group handover is provided. The base station includes a receiving module configured to receive the information sent by an RN and a UE served by the RN, a handover module configured to select a target base station (i.e., a T-DeNB) to be Re-switched for the RN and the UE served by RN and to switch the RN to the base station T-DeNB and the UE served by the RN to the T-DeNB, wherein the handovers are performed simultaneously or separately, and a transmitting module configured to send information to the RN and the UE served by the RN.

Other aspects, advantages, and salient features of the disclosure will be apparent to those skilled in the art form the following detailed description, which, taken in conjunction with the annexed drawings, discloses various embodiments of the present disclosure.

A method or device set forth in the present disclosure is applicable to an architecture where a Serving Gateway (S-GW) and Packet Data Network (PDN) GW of an RN are co-located at the RN or to an architecture where the S-GW and the PDN GW of the RN are single entities (e.g., the S-GW/PDN GW is not co-located with the RN at the same entity). In addition, in a method or device set forth in the present disclosure, the S-GW of an RN and the S-GW of a UE served by the RN may be different. The cell of an RN has a unique 28 bit cell identifier along the high-speed railway, and the RN supports Public Land Mobile Network (PLMN) along the railway. The cell identifier of the RN may not include an identifier of a DeNB. A method or device set forth in the present disclosure can reduce unnecessary signaling procedure, the possibility of network congestion, and the signaling procedure of handover, so as to reduce the failure of the handover process and ensure the continuity of service.

BRIEF DESCRIPTION OF THE DRAWINGS

The above and other aspects, features, and advantages of certain embodiments of the present disclosure will be more apparent from the following depiction taken in conjunction with the accompanying drawings, in which.

The same reference numerals are used to represent the same elements throughout the drawings.

DETAILED DESCRIPTION

Figure 1:
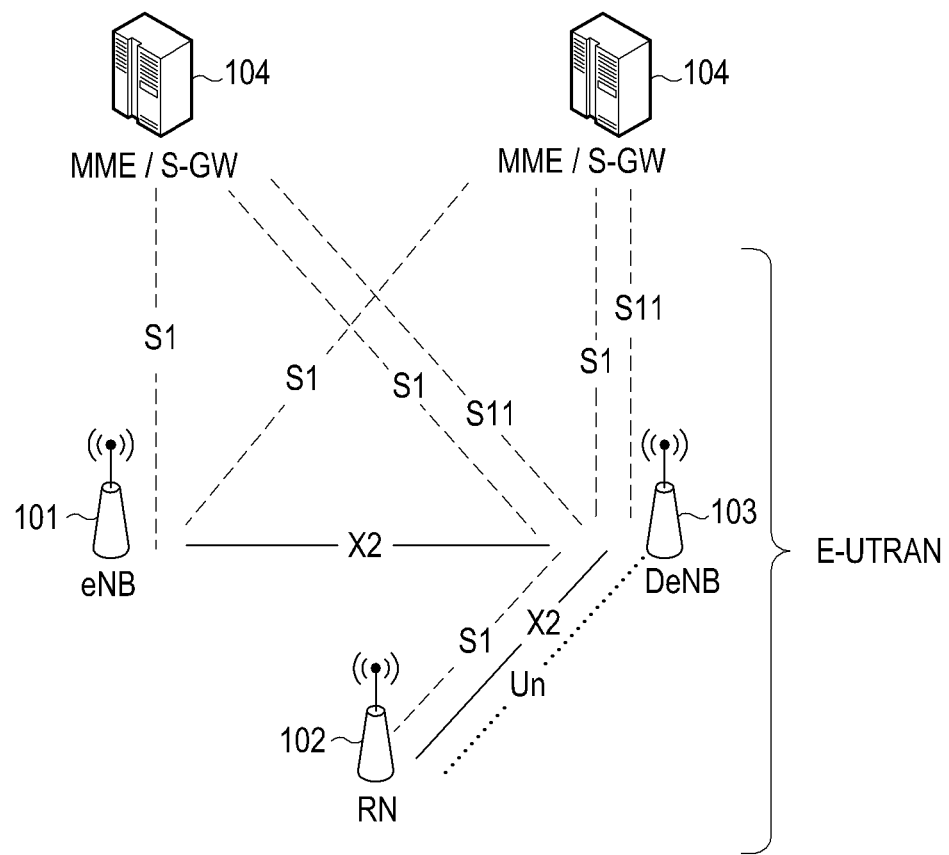
FIG. 1 is a schematic diagram of a Long Term Evolution (LTE) system including supporting Relay Nodes (RN) according to the related art.
Figure 2:
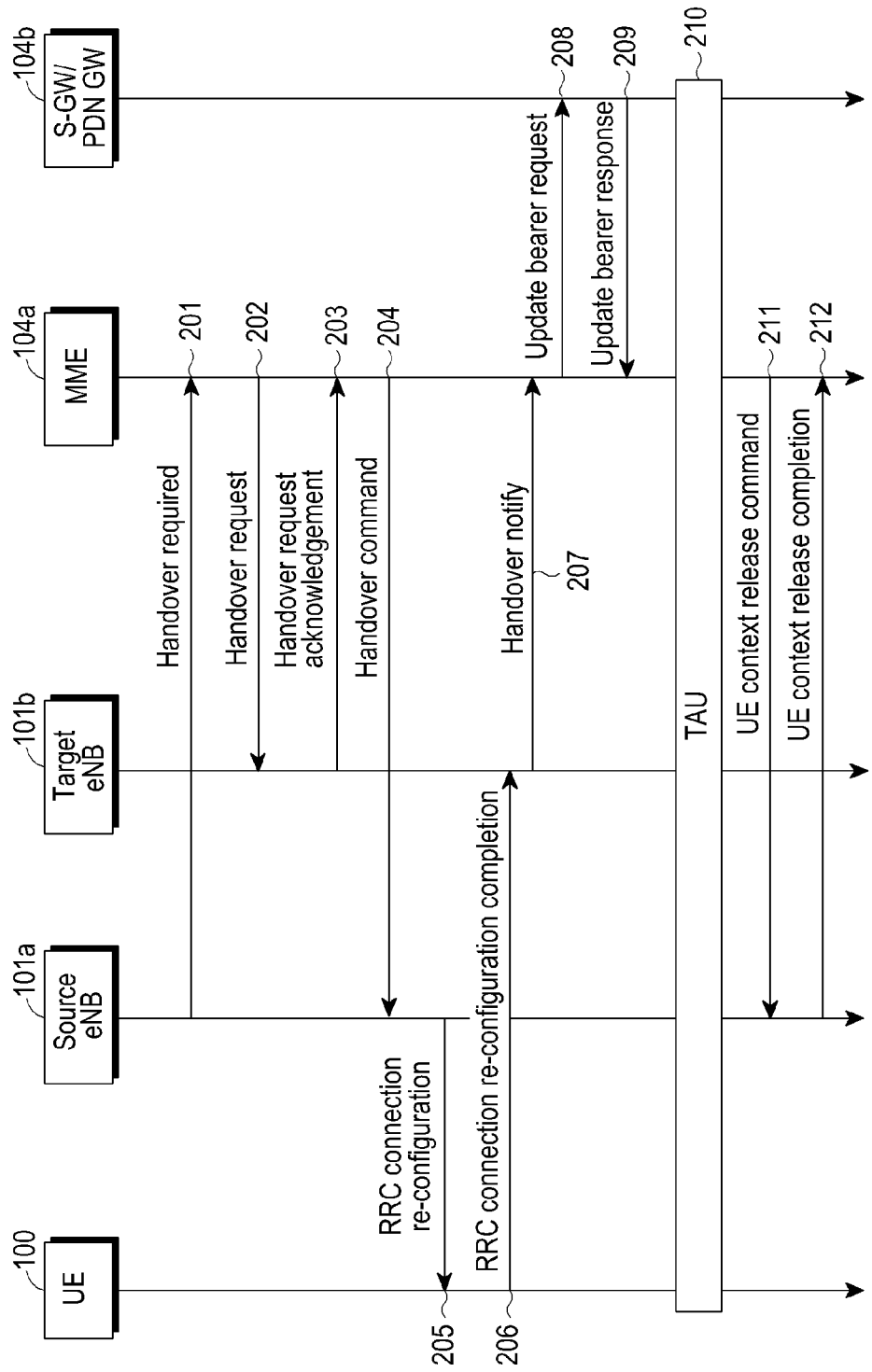
FIG. 2 describes a handover process of an existing UE, taking S1 handover as an example according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the present disclosure provide a method for supporting group handover, which is applied to a User Equipment (UE) in communication with a network via a Relay Node (RN). In an embodiment, the present invention may include various steps as described below.

A base station (i.e., Source-Donor evolved e Node B (S-DeNB)) hands over an RN to a base station (i.e., Target-DeNB (T-DeNB)), and the S-DeNB hands over the UE served by the RN to the T-DeNB, wherein the handovers are performed simultaneously or separately.

In more detail, the above method may include the following procedure.

A source Mobility Management Entity (MME), that the RN belongs to, transmits the UE context to a target MME of the UE via a target MME that the RN belongs to after obtaining the UE context, or the target MME, that the RN belongs to, transmits the UE context to the target MME of UE after obtaining the UE context.

In more detail, in the above method, the MME that the RN belongs to notifies the source MME or the target MME of the UE of handover of the UE, wherein the context of the UE is sent to the target MME of the UE by the source MME of the UE.

In more detail, in the above method, the base station S-DeNB hands over the RN to the base station T-DeNB and the S-DeNB hands over the UE served by the RN to the T-DeNB may include further operations as described below.

The S-DeNB initiates a handover preparation processes for the RN and the UE served by the RN.

The S-DeNB sends a Radio Resource Control (RRC) connection re-configuration message to the RN, the message including information of the UE served by the RN.

The RN sending an RRC connection re-configuration completion message to the T-DeNB.

In more detail, in the above method, the S-DeNB sends an RRC connection re-configuration message to the RN, and the RN sends an RRC connection re-configuration completion message to the T-DeNB receiving module, establishing a user plane between the RN and the T-DeNB and a signaling connection between the RN and the T-DeNB for the UE served by the RN via the RRC connection re-configuration process.

In more detail, in the above method, the information of the UE served by the RN included in the RRC connection re-configuration message may include the following elements.

An eNB UE S1 AP ID of the UE in the RN and the T-DeNB interface, and an MME UE S1 AP ID allocated by the T-DeNB in the RN and the T-DeNB interface.

The E-RAB information of the UE, including an E-RAB identifier, and an uplink TEID and transport layer address of the RN and the T-DeNB interface allocated by the T-DeNB for the UE served by the RN.

In more detail, in the above method, the RRC connection re-configuration completion message includes information of the UE served by the RN, the information of the UE including the E-RAB identifier of the UE, and the downlink TEID and transport layer address allocated by the RN.

In more detail, in the above method, in the handover preparation stage, the S-DeNB notifies the T-DeNB of the information of the UE served by the RN, and the T-DeNB allocating resource in the RN and the T-DeNB interface and in the T-DeNB and the MME interfaces for the UEs according to the received information.

In more detail, in the above method, the information of the UE served by the RN notified by the S-DeNB to the T-DeNB may include the following elements.

An eNB UE S1 AP ID and/or an MME UE S1 AP ID of the UE in the S1 interface between the RN and the S-DeNB.

The information of the UE served by the RN notified by the S-DeNB to the T-DeNB may include the MME serving the UE.

In more detail, in the above method, the information of the UE served by the RN notified by the S-DeNB to the T-DeNB may include an eNB UE S1 AP ID and/or an MME UE S1 AP ID of the UE in the S1 interface between the S-DeNB and the S-MME.

In more detail, in the above method, the information of UE served by RN notified by S-DeNB to T-DeNB may include E-RAB information of the UE including an E-RAB identifier, and a downlink TEID and transport layer address in the RN and the S-DeNB interfaces allocated by the RN for the UE.

In more detail, in the above method, the handover preparation processes for the RN and the UE served by the RN by the S-DeNB may include a process as described below.

The S-DeNB sends a handover required message to the MME, the message including the information of the UE served by the RN.

The MME sends a handover request message to the T-DeNB, the message including information of the UE served by the RN.

The T-DeNB allocates resources and sends a handover request acknowledgement message to the MME, the message including information of the UE served by the RN.

The MME sends a handover command message to the S-DeNB, the message including information of the UE served by the RN.

In more detail, in the above method, the handover completion may include a process as described below.

The T-DeNB sends a handover notify message to the MME of the RN.

The T-DeNB sends a path switch request to the MME of the UE for each UE served by the RN.

The MME of the UE notifies a Serving Gateway (S-GW) of switching downlink user plane transmission path.

The MME of the UE sends a path switch request acknowledgement message to the T-DeNB.

In more detail, the above method may further include a process as described below.

The T-DeNB notifying the target MME that the source MME served for the UE by the path switch request message, wherein the target MME requests the source MME to obtain the UE context information.

In more detail, in the above method, the handover preparation processes for the RN and the UE served by the RN by S-DeNB may include a process as described below.

The S-DeNB sends a handover request message to the T-DeNB, the message including information of the UE served by the RN.

The T-DeNB allocates resources and sends a handover request acknowledgement message to the S-DeNB, the message including information of the UE served by the RN.

In more detail, in the above method, the handover completion process may include a process as described below.

The T-DeNB sends a path switch request message to the MME of the RN, the MME of the RN sends a path switch request acknowledgement message to the T-DeNB.

The T-DeNB sends a path switch request to the MME of the UE for each UE served by the RN.

The MME of the UE notifies the S-GW of switching a downlink user plane transmission path.

The MME of the UE sends a path switch request acknowledgement message to the T-DeNB.

Figure 11:
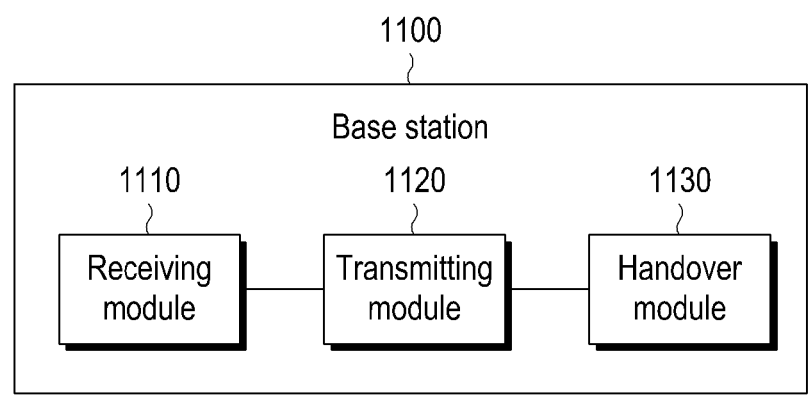
FIG. 11 is a schematic diagram of a structure of a base station according to an embodiment of the present disclosure.

FIG. 11 is a schematic diagram of a structure of a base station according to an embodiment of the present disclosure.

Referring to FIG. 11, a base station 1100 for supporting group handover includes a receiving module 1110, a transmitting module 1120 and a handover module 1130, The receiving module 1110 is used for receiving information sent by the RN and the UE served by the RN.

The handover module 1130 is used for selecting a target base station T-DeNB to be switched for the RN and the UE served by the RN, and for switching the RN to the base station T-DeNB and the UE served by the RN to the T-DeNB, wherein the handovers are performed simultaneously and separately.

The transmitting module 1120 is used for sending information to the RN and the UE served by the RN.

In more detail, the handover module 1130 switching the RN to the base station T-DeNB and the S-DeNB switching the UE served by the RN to the T-DeNB may include additional details as described below.

The handover module 1130 initiating handover preparation processes for the RN and the UE served by the RN.

The transmission module 1120 sending an RRC connection re-configuration message to the RN, the message including information of UE served by the RN.

The RN sending an RRC connection re-configuration completion message to the T-DeNB.

In more detail, the transmitting module 1120 sends an RRC connection re-configuration message to the RN which sends an RRC connection re-configuration completion message to the T-DeNB receiving module, establishing a user plane between the RN and the T-DeNB and a signaling connection between the RN and the T-DeNB for the UE served by the RN via the RRC connection re-configuration process.

The information of the UE served by the RN included in the RRC connection re-configuration message may include the following information.

An eNB UE S1 AP ID of the UE in the RN and the T-DeNB interfaces, and an MME UE S1 AP ID allocated by the T-DeNB in the RN and the T-DeNB interface.

Alternatively, the information may include E-RAB information of the UE, including an E-RAB identifier, and an uplink TEID and transport layer address in the RN and the T-DeNB interfaces allocated by the T-DeNB for the UE served by the RN.

Wherein, the RRC connection re-configuration completion message includes information of the UE served by the RN, the information of the UE including an E-RAB identifier of the UE, and a downlink TEID and transport layer address allocated by the RN.

In more detail, in the handover preparation stage, the transmitting module 1120 notifies the T-DeNB of the information of the UE served by the RN, the T-DeNB allocates resource for the UE in the RN and the T-DeNB interface as well as in the T-DeNB and the MME interface for the UE according to the received information.

The information of UE served by the RN notified by the transmission module 1120 to T-DeNB may include the following information.

An eNB UE S1 AP ID and/or an MME UE S1 AP ID of the UE in the S1 interface between the RN and the S-DeNB.

Wherein, the information of the UE served by the RN notified by the transmission module 1120 to the T-DeNB may include an eNB UE S1 AP ID and/or an MME UE S1 AP ID of the UE in the S1 interface between the S-DeNB and the S-MME.

In more detail, the information of the UE served by the RN notified by the transmission module 1120 to the T-DeNB may include E-RAB information of the UE including an E-RAB identifier, and an uplink TEID and transport layer address of the RN and the S-DeNB interfaces allocated by the RN for the UE.

The information of the UE served by the RN notified by the transmission module 1120 to the T-DeNB may include the MME served for the UE.

In more detail, the handover preparation processes for the RN and the UE served by the RN by the handover module 1130 may include the following process.

The transmission module 1120 sends a handover required message to the MME, the message including information of the UE served by the RN.

The MME sends a handover request message to the T-DeNB, the message including information of the UE served by the RN.

The T-DeNB allocates resources and sends a handover request acknowledgement message to the MME, the message including information of the UE served by the RN.

The MME sends a handover command message to the receiving module 1110, the message including information of the UE served by the RN.

In an embodiment, the handover completion process may include the following process.

The T-DeNB sends a handover notify message to the MME of the RN.

The T-DeNB sends a path switch request to the MME of the UE for each UE served by the RN.

The MME of the UE notifies the S-GW of switching downlink user plane transmission path.

The MME of the UE sends a path switch request acknowledgement message to T-DeNB.

The process may further include additional operations described in the following process.

The T-DeNB notifying the target MME that the source MME served for the UE by the path switch request message, which includes the target MME requesting the source MME to obtain the UE context information.

In more detail, a handover preparation processes for the RN and the UE served by the RN by the handover module 1130 may include the following process.

The transmission module 1120 sends a handover request message to the T-DeNB, the message including information of the UE served by the RN.

The T-DeNB allocates resources and sends a handover request acknowledgement message to the S-DeNB, the message including information of the UE served by the RN.

Wherein the handover completion process may include the following process.

The T-DeNB sends a path switch request message to the MME of the RN and the MME of the RN sends a path switch request acknowledgement message to the T-DeNB.

The T-DeNB sends a path switch request to the MME of the UE for each UE served by the RN.

The MME of the UE notifies the S-GW of switching a downlink user plane transmission path.

The MME of the UE sends a path switch request acknowledgement message to the T-DeNB.

The method or device set forth in the present disclosure is applicable to an architecture where the S-GW and the PDN GW of the RN are co-located at the RN or to the architecture where the S-GW and the PDN GW of the RN are single entities (i.e., the S-GW/PDN GW is not co-located with the RN at the same entity). In addition, in the method or device set forth in the present disclosure, the S-GW of the RN and the S-GW of the UE served by the RN may be different. The cell of the RN has a unique 28 bit cell identifier along the high-speed railway, and the RN supports Public Land Mobile Network (PLMN) along the railway. The cell identifier of the RN may not include an identifier of the DeNB. The method or device set forth in the present disclosure can reduce unnecessary signaling, the possibility of network congestion, and the signaling necessary for handover, so as to reduce the failure of the handover process and ensure the continuity of service.

In order to further clarify the objectives and advantages of the present disclosure, a method and device set forth in the present disclosure are further expounded by examples with reference to the accompanying drawings as follows.

Embodiment One

Figure 3:
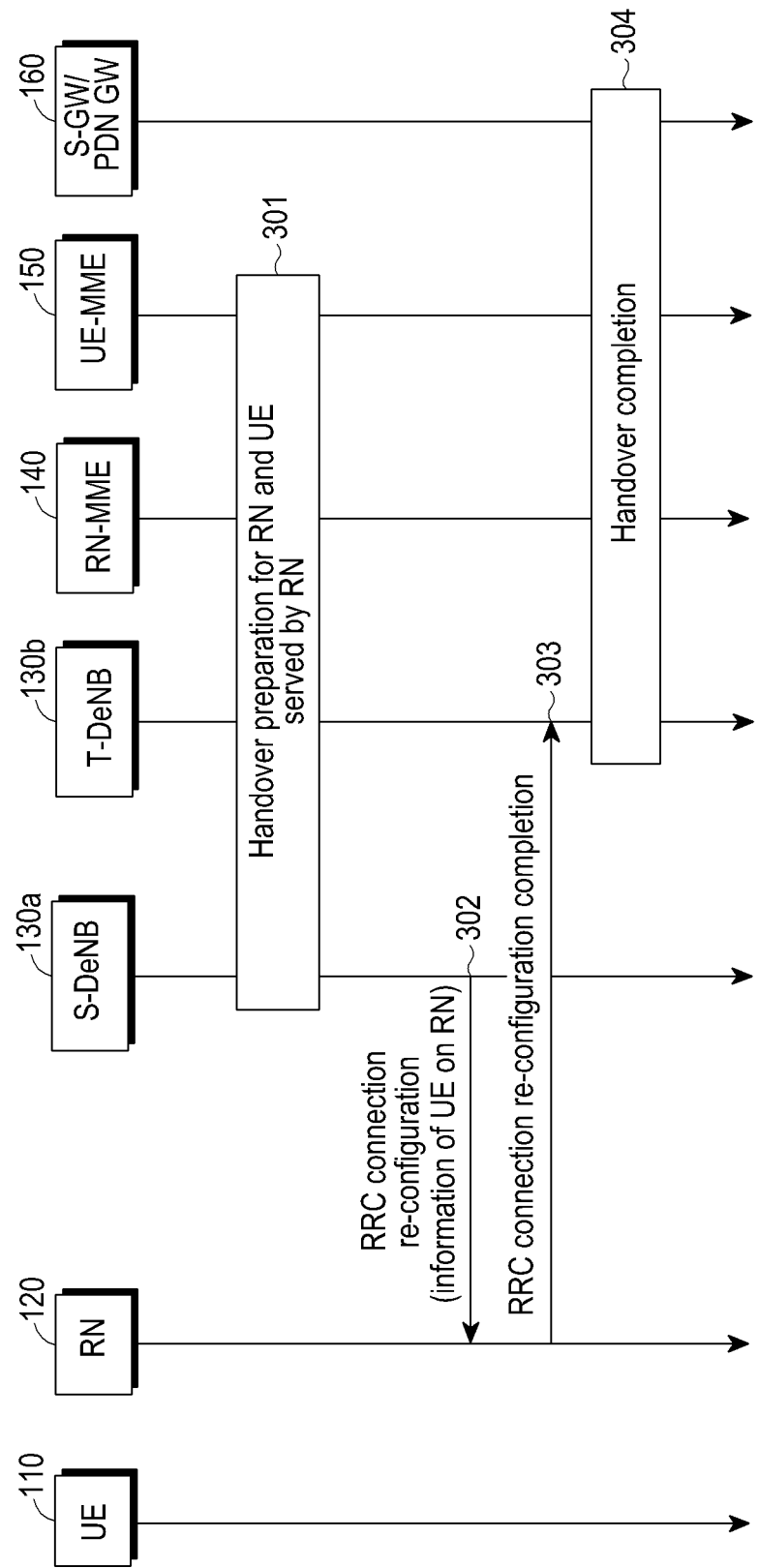
FIG. 3 is a flow diagram of supporting group handover according to an embodiment of the present disclosure.

FIG. 3 is a flow diagram of supporting group handover according to an embodiment of the present disclosure.

Referring to FIG. 3, an S-DeNB 130a triggers handover preparation processes for an RN 120 and a UE 110 served by the RN 120 in operation 301. During the handover preparation process, allocation for the RN resource by the T-DeNB 130b in a Un interface is completed. It is necessary to transmit the eNB UE 110 an S1 AP ID and/or an MME UE S1 AP ID of the UE 110 served by the RN 120 in the RN and the T-DeNB interfaces to the S-DeNB 130a. It is necessary to transmit the uplink TEID and transport layer address of the UE 110 served by the RN 120 allocated in the RN and the T-DeNB interfaces to the S-DeNB 130a.

In operation 302, the S-DeNB 130a sends an RRC connection re-configuration message to the RN 120. The message includes mobile control information of the RN 120 as the UE 110. The message further includes information of the UE 110 served by the RN 120. The information of the UE 110 may include one or more of the following pieces of information.

An eNB UE S1 AP ID and an MME UE S1 AP ID (allocated by the T-DeNB 130b) of the UE 110 in the RN and the T-DeNB interfaces.

E-RAB information of the UE 110 including E-RAB identifier, and an uplink TEID and transport layer address in the RN 120 and the T-DeNB interface allocated by the T-DeNB 130b for the UE 110 served by the RN 120.

The above information can be transmitted to the S-DeNB 130a from the T-DeNB 130b, and then transmitted to the RN 120 by the S-DeNB 130a.

The RN 120 stores the above received information. The UE 110 implicitly establishes UE associated signaling connection of the UE 110 served by the RN 120 in the RN 120 and the T-DeNB interface after receiving an RRC connection re-configuration message, and also establishes a user plane of the UE 110 served by the RN 120 between the RN 120 and the T-DeNB 130b.

In operation 303, the RN 120 sends an RRC connection re-configuration completion message to the T-DeNB 130b.

The RN 120 can send uplink data sent by the UE 110 under the RN 120 to the T-DeNB 130b through the above received uplink TEID and transport layer address in the RN 120 and the T-DeNB interface.

There are two ways to let the T-DeNB 130b know the downlink TEID and transport layer address allocated by the RN 120 for the UE 110 served by the RN 120 in the RN and the T-DeNB interfaces. One way is that the S-DeNB 130a sends the E-RAB identifier of the UE 110 and the downlink TEID and transport layer address allocated by the RN 120 to the T-DeNB 130b during the handover preparation process. The other way is that the information of the UE 110 served by the RN 120 is included in the RRC connection re-configuration completion message. The information of the UE 110 includes the E-RAB information of the UE 110, and the E-RAB information includes the E-RAB identifier as well as the downlink TEID and transport layer address allocated by the RN 120.

In operation 304, the target DeNB notifies the RN MME and the UE MME of handover completion and to switch the user plane transmission path.

Embodiment Two

In the process of movement of the RN 120, it is necessary to switch from a source base station S-DeNB 130a to a target base station T-DeNB 130b, and this embodiment provides handover procedures of the RN 120 and the UE 110, ensures the continuity of service of the UE 110 served by the RN 120, and reduces handover signaling. An explanation and description of operations that are irrelevant to the present disclosure are omitted.

Figure 4:
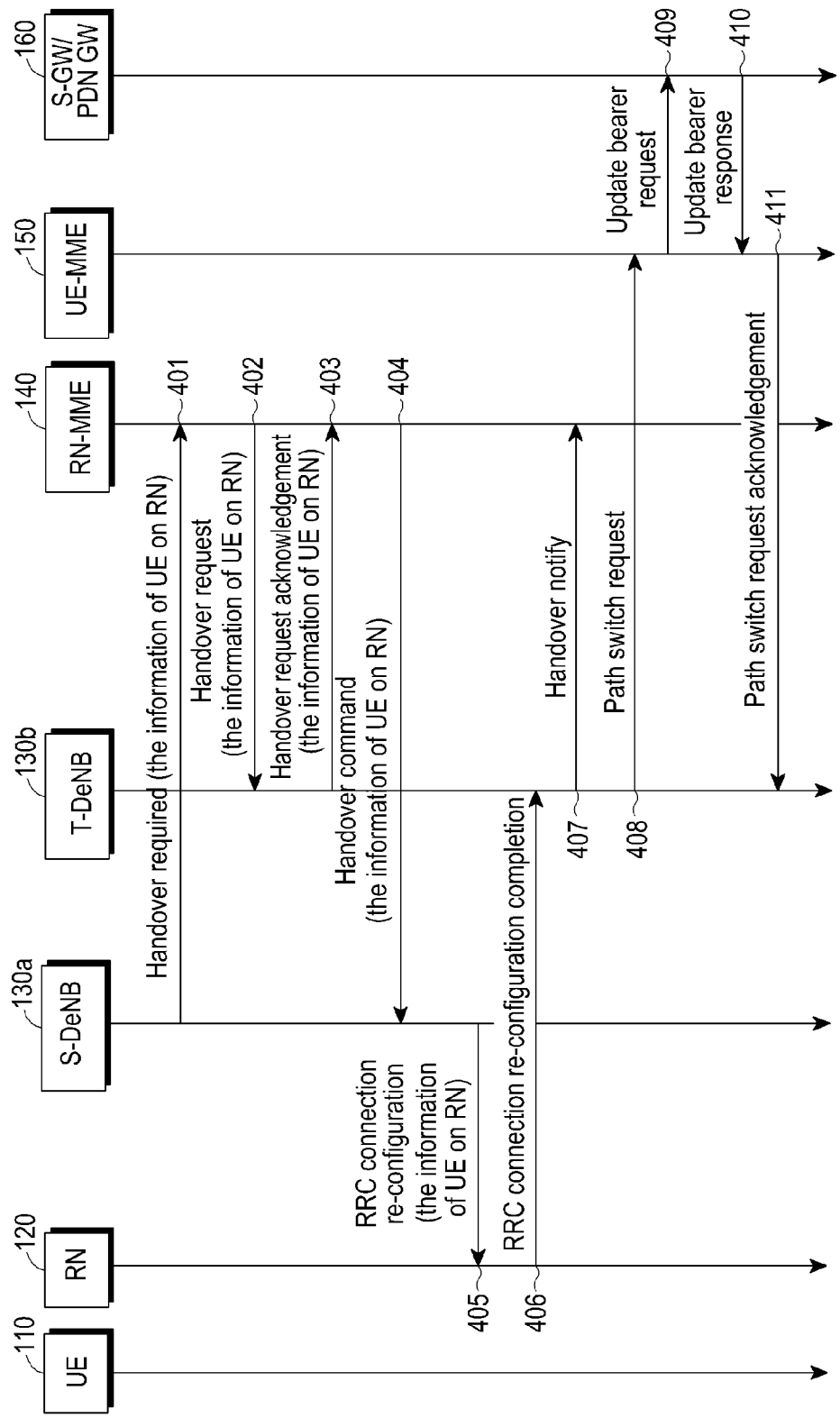
FIG. 4 is a flow diagram of supporting group handover according to an embodiment of the present disclosure.

FIG. 4 is a flow diagram of supporting group handover according to an embodiment of the present disclosure.

Referring to FIG. 4, the S-DeNB 130a decides to initiate handover of the RN 120. The S-DeNB 130a switches the UE 110 served by the RN 120 to the T-DeNB 130b at the same time. The S-DeNB 130a sends a handover required message to the MME of the RN 120 (i.e., RN-MME 140). The handover required message includes all the existing information of the RN 120 as the UE 110. That is, information of the UE 110 is included in the existing handover required. The message also includes the information of the UE 110 served by the RN 120. The information of the UE 110 may include information as described below.

An eNB UE S1 AP ID and an MME UE S1 AP ID of the UE 110 in an S1 interface the between the RN 120 and the S-DeNB 130a.

An eNB UE S1 AP ID and an MME UE S1 AP ID of the UE 110 in an S1 interface between the S-DeNB 130a and the S-MME. Alternatively, the UE information may not include this part of information, since the S-MME has already known this part of information.

E-RAB information of the UE 110 (e.g., E-RAB identifier). It may also include a downlink TEID and transport layer address of the UE 110 in the RN and the S-DeNB interfaces allocated by the RN 120.

The MME served for the UE 110, such as a Global Unique Temporary Identifier (GUMMEI).

The S-DeNB 130*a* selects the PLMN of a target service for each UE 110 according to a Handover Restriction List (HRL) of the UE 110 served by the RN 120, and the target PLMN selected for the UE 110 is included in the UE information, which may be a PLMN identifier, or may be included in the selected TAI.

In operation 402, the RN-MME 140 sends a handover request message to the T-DeNB 130*b*. The message includes the identifier information and bearer information of the RN 120 as the UE 110, that is, the information of the UE 110 included in the existing handover request message. The handover request message includes information of the UE 110 served by the RN 120. The UE information may include the following information as described below.

E-RAB information to be established by the UE 110 served by the RN 120, including an E-RAB identifier and QoS information of the E-RAB. It may also include a downlink TEID and transport layer address allocated by the UE 110 served by the RN 120 for the RN 120 in the RN and the S-DeNB interfaces.

An eNB UE S1 AP ID and an MME UE S1 AP ID of the UE 110 in an S1 interface between the RN 120 and the S-DeNB 130*a*.

The MME served for the UE 110 (e.g., GUMMEI).

In operation 403, the T-DeNB 130*b* allocates a wireless resource of a Un interface for the RN 120. The T-DeNB 130*b* allocates uplink a TEID and transport layer address of the RN and the T-DeNB interfaces for the UE 110 served by the RN 120. The T-DeNB 130*b* allocates the MME UE S1 AP ID in the RN and the T-DeNB interfaces for the UE 110 served by the RN 120.

The T-DeNB 130*b* sends a handover request acknowledgement message to the RN-MME 140. The message includes information of the RN 120 as the UE 110, that is, the information of the UE 110 included in the existing demand acknowledgement message (e.g., eNB UE S1 AP ID, MME UE S1 AP ID, the received E-RAB information, and the failed E-RAB information).

The message includes information of the UE 110 served by the RN 120. The information of the UE 110 may include the following information as described below.

An eNB UE S1 AP ID and an MME UE S1 AP ID (allocated by the T-DeNB 130*b*) of the UE 110 in the RN 120 and T-DeNB interface.

E-RAB information of the UE 110, including E-RAB identifier, and an uplink TEID and transport layer address of the RN 120 and the T-DeNB interfaces allocated by the T-DeNB 130*b* for the UE 110 served by the RN 120.

In operation 404, the RN-MME 140 sends a handover command message to the S-DeNB 130*a*. The message includes information of the RN 120 as the UE 110 (e.g., eNB UE S1 AP ID and MME UE S1 AP ID of the RN 120).

The message also includes information of the UE 110 served by the RN 120. The information of the UE 110 may include the following information as described below.

An eNB UE S1 AP ID and an MME UE S1 AP ID (allocated by the T-DeNB 130*b*) of the UE 110 in the RN and the T-DeNB interfaces.

E-RAB information of the UE 110, including the E-RAB identifier, and the uplink TEID and the transport layer address in the RN and the T-DeNB interfaces allocated by the T-eNB for the UE 110 served by the RN 120.

In operation 405, the S-DeNB 130*a* sends an RRC connection re-configuration message to the RN 120. The message includes mobile control information of the RN 120 as the UE 110, that is, the information of the UE 110 included in the existing RRC connection re-configuration message.

The message also includes the information of the UE 110 served by the RN 120. The UE information may include the following as described below.

An eNB UE S1 AP ID and an MME UE S1 AP ID (allocated by the T-DeNB 130*b*) of the UE 110 in the RN and the T-DeNB interfaces.

E-RAB information of the UE 110, including the E-RAB identifier, and the uplink TEID and transport layer address of the RN and the T-DeNB interfaces allocated by the T-eNB for the UE 110 served by the RN 120.

The above information may be transmitted to the RN 120 from the T-DeNB 130*b* by the containers in the messages of operation 403, operation 404, and operation 405, or may be transmitted to the S-DeNB 130*a* by the containers in the messages of operation 403 and operation 404, wherein the S-DeNB 130*a* sends the above information to the RN 120, or may be transmitted to the RN 120 directly in the messages of operation 403, operation 404, and operation 405. Or the S-DeNB 130*a* sends the above information to the RN 120 in this step by one container, e.g. UE S1 AP container.

The RN 120 stores the above received information. The UE 110 implicitly establishes UE associated signaling connection of the RN and the T-DeNB interfaces of the UE 110 served by the RN 120 after receiving the RRC connection re-configuration message, and also establishes a user plane of the UE 110 served by the RN 120 between the RN 120 and the T-DeNB 130*b*.

In operation 406, the RN 120 sends an RRC connection re-configuration completion message to the T-DeNB 130*b*.

The RN 120 can send uplink data sent by the UE 110 under the RN 120 to the T-DeNB 130*b* through the above received uplink TEID and transport layer address of the RN 120 and the T-DeNB interface.

There are two ways to let the T-DeNB 130*b* know the downlink TEID and transport layer address of the UE 110 served by the RN 120 that are allocated by the RN 120 in the RN and the T-DeNB interfaces. One way is including the E-RAB identifier of the UE 110 and the downlink TEID and transport layer address allocated by the RN 120 in operation 401 and operation 402. The other way is including information of the UE 110 served by the RN 120 in the RRC connection re-configuration completion message. The UE information includes E-RAB information of the UE 110. The E-RAB information includes the E-RAB identifier, and the downlink TEID and transport layer address allocated by the RN 120.

In operation 407, the T-DeNB 130*b* sends a handover notify message to the RN-MME 140.

In operation 408, the T-DeNB 130*b* has known the MME of each UE 110 served by the RN 120 from operations 401 and 402. For each UE 110 served by the RN 120, the T-DeNB 130*b* sends a path switch request message to the MME of the UE 110. The message includes the eNB UE S1 AP ID of the UE 110 in the T-DeNB and the MME interfaces, and the MME UE S1 AP ID of the source MME. The message includes the E-RAB information to be switched in downlink. The message also includes an E-UTRAN Cell Global Identifier (ECGI) and a Tracking Area Identifier (TAI) of the target cell. The TAI includes the PLMN identifier selected by the S-DeNB 130*a* for the UE 110.

In operation 409, the UE-MME 150 sends an update bearer request message to the S-GW/PDN GW 160 of the UE 110. The depiction about the signaling procedure between the S-GW and the PDN GW is omitted. The message includes a downlink TEID and transport layer address allocated by the T-DeNB 130*b* for the UE 110. If the target PLMN re-selected for the UE 110 is different from the source PLMN, and the target PLMN is received from the source DeNB in operations 401 and 402, the T-MME sends a new TAI to the S-GW in the modification bearer request message, and the S-GW sends the message to the PDN GW, and the message also may include the ECGI. The PDN GW may perform a reasonable billing for the UE 110 according to this information.

In operation 410, the S-GW/PDN GW 160 of the UE 110 sends an update bearer response message to the UE-MME 150.

In operation 411, the UE-MME 150 sends a path switch request acknowledgement message to the T-DeNB 130*b*.

Now, the work procedure of supporting group handover in this embodiment is completed. In this embodiment, the source of UE 110 served by the RN 120 that is allocated under the RN 120 cell does not need to be re-configured. The handover process does not occur in the access layer from the UE end.

Embodiment Three

In the movement process of the RN 120, it is necessary to switch from a source base station S-DeNB 130*a* to a target base station T-DeNB 130*b*. This embodiment provides handover procedures of the RN 120 and the UE 110, ensures the continuity of service of the UE 110 served by the RN 120 and reduces handover signaling.

This embodiment differs from embodiment one in that, in embodiment one, re-location of the MME of the RN 120 and of the MME of the UE 110 does not occur. In this embodiment, re-location of the MME of the RN 120 and the MME of the UE 110 occurs. The method of this embodiment is also used in the case that there is only re-location of the MME of the RN 120 or that there is only re-location of the MME of the UE 110, or that there is only re-location of part of the MME of the UE 110. In this embodiment, the source MME of the RN (e.g., the S-RN-MME 140*a*) selects a target MME (e.g., the T-UE-MME 150*b*) for the UE 110.

Figure 5:
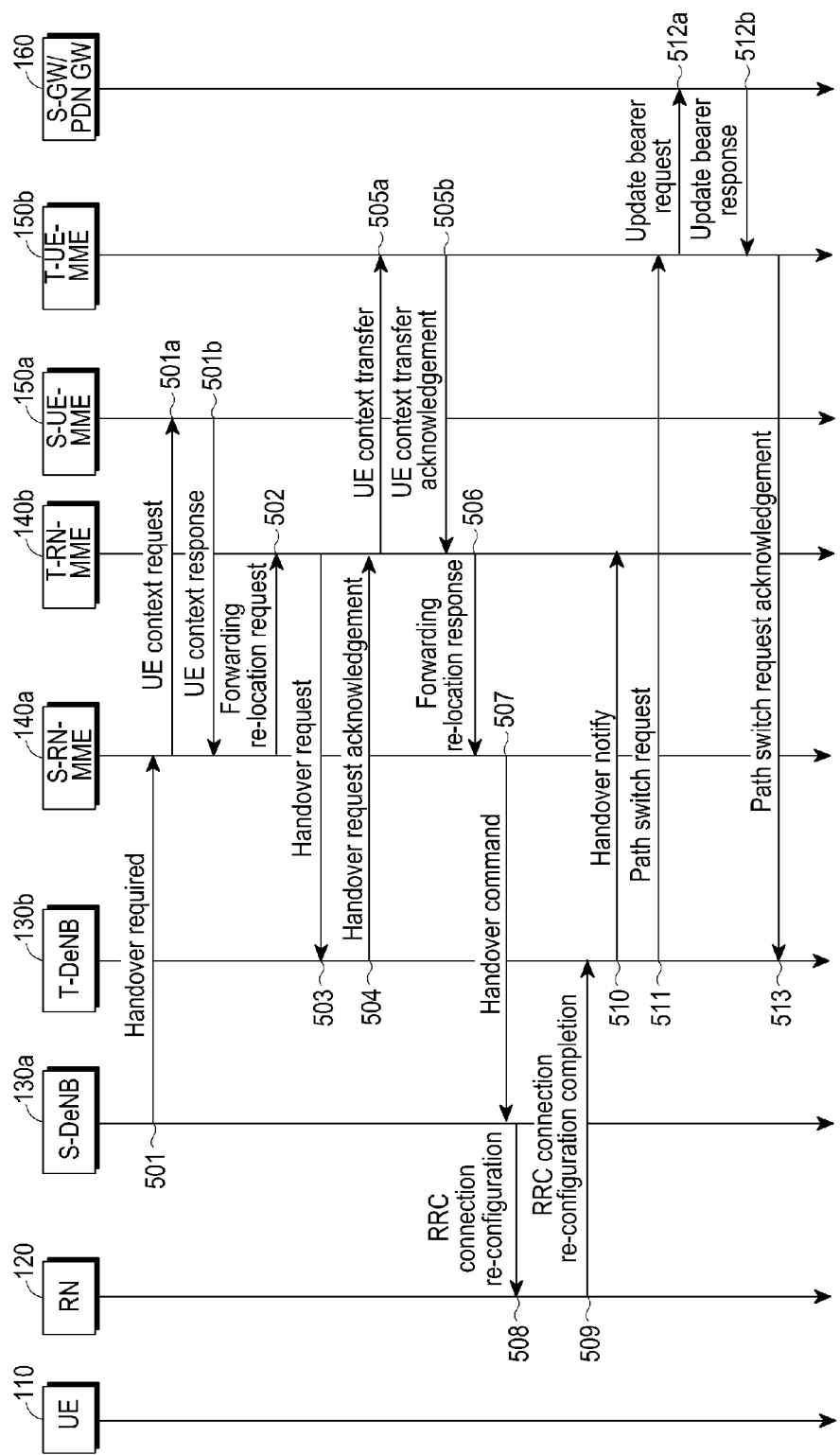
FIG. 5 is a flow diagram of supporting group handover according to an embodiment of the present disclosure.

FIG. 5 is a flow diagram of supporting group handover according to an embodiment of the present disclosure.

Referring to FIG. 5, the S-DeNB 130*a* decides to initiate handover of the RN 120 in operation 501. The S-DeNB 130*a* switches the UE 110 served by the RN 120 to the T-DeNB 130*b* at the same time. The S-DeNB 130*a* sends a handover required message to the source MME of the RN (e.g., the S-RN-MME 140*a*). The handover required message includes all the existing information of the RN 120 as the UE 110, that is, information of the UE 110 included in the existing handover required message. The message also includes information of the UE 110 served by the RN 120. The information of the UE 110 includes the following information as described below.

An eNB UE S1 AP ID and an MME UE S1 AP ID of the UE 110 in the S1 interface between the RN 120 and the S-DeNB 130*a*.

An eNB UE S1 AP ID and an MME UE S1 AP ID of the UE 110 in an S1 interface between the S-DeNB 130*a* and the S-MME. Alternatively, the UE information also may not include this part of information, since S-MME has already known this part of information.

E-RAB information of the UE 110, such as the E-RAB identifier. It may also include the downlink TEID and transport layer address of the UE 110 allocated by the RN 120 in the RN and S-DeNB interfaces.

The MME served for the UE 110, e.g. GUMMEI.

The S-DeNB 130*a* selects the PLMN of target service for each UE 110 according to a Handover Restriction List (HRL) of the UE 110 served by the RN 120. And the target PLMN selected for the UE 110 is included in the information of the UE 110, which may be a PLMN identifier, or may be included in the selected TAI.

In operation 501*a*, the S-RN-MME 140*a* judges whether the UE 110 served by the RN 120 needs re-location and whether it is necessary to re-locate the MME for the UE 110, according to the target cell and the target DeNB of the PLMN and the RN 120 selected by the source DeNB for the UE 110. If re-location is needed, the target MME (e.g., the T-UE-MME 150*b*) is selected for the UE 110.

After the target MME of the UE 110 is selected, it is necessary to transfer context of the UE 110 from the source MME of the UE 110 to the target MME, which can be achieved as described below.

In a first method, the S-RN-MME 140*a* requests the S-UE-MME 150*a* for context of the UE 110, and sends the context of the UE 110 to the T-RN-MME 140*b*, which is then sent to the S-UE-MME 150*a* by the T-RN-MME 140*b*. The details are stated as that in operations 501*a*, 501*b*, 502 and operations 505*a* and 505*b*.

In a second method, the S-RN-MME 140*a* sends the selected T-UE-MME 150*b* to the S-UE-MME 150*a*, and the S-UE-MME 150*a* transfers context of the UE 110 to the T-UE-MME 150*b*.

In a third method, the S-RN-MME 140*a* sends messages to the T-UE-MME 150*b*, and notifies the T-UE-MME 150*b* of information of the source UE-MME. The T-UE-MME 150*b* requests the S-UE-MME 150*a* for context information of the UE 110.

In a fourth method, the S-RN-MME 140*a* notifies the T-RN-MME 140*b* of the selected target UE-MME. The T-RN-MME 140*b* notifies the S-UE-MME 150*a* of information of re-location of the MME and the T-UE-MME 150*b*, and the S-UE-MME 150*a* transfers the context information of the UE 110 to the T-UE-MME 150*b*.

In a fifth method, the S-RN-MME 140*a* notifies the T-RN-MME 140*b* of the selected target UE-MME. The T-RN-MME 140*b* sends messages to the T-UE-MME 150*b*, and notifies the T-UE-MME 150*b* of information of the source UE-MME. The T-UE-MME 150*b* requests the S-UE-MME 150*a* for the context information of the UE 110.

In operation 501*a*, the S-RN-MME 140*a* sends a UE context request message to the S-UE-MME 150*a*. The S-RN-MME 140*a* knows the source MME of the UE 110 from the message of operation 401.

In operation 501*b*, the S-UE-MME 150*a* sends a UE context response message to the S-RN-MME 140*a*. The message includes context information of the UE 110 in the S-UE-MME 150*a*.

Operations 501*a* and 401*b* are directed to each UE 110 served by the RN 120.

In operation 502, the S-RN-MME sends a forwarding re-location request message to the T-RN-MME 140*b*. The message includes information of the UE 110 served by the RN 120 in operation 501 and the target MME selected for the UE 110.

In operation 503, the T-RN-MME 140*b* sends a handover request message to the T-DeNB 130*b*. The message includes the identifier information and bearer information of the RN 120 as the UE 110. The handover request message includes information of the UE 110 served by the RN 120. The information of the UE 110 may include information as described below.

E-RAB information to be established by the UE 110 served by the RN 120, including the E-RAB identifier and QoS information of the E-RAB. It may also include the downlink TEID and transport layer address of the UE 110 served by the RN 120 allocated by the RN 120 in the RN and the S-DeNB interfaces.

An eNB UE S1 AP ID, and an MME UE S1 AP ID of the UE 110 in the S1 interface between the RN 120 and the S-DeNB 130*a*.

The target MME served for the UE 110, e.g. GUMMEI.

In operation 504, the T-DeNB 130*b* allocates a wireless resource in a Un interface for the RN 120. The T-DeNB 130*b* allocates an uplink TEID and transport layer address in the RN and the T-DeNB interfaces for the UE 110 served by the RN 120. The T-DeNB 130*b* allocates the MME UE S1 AP ID in the RN and the T-DeNB interfaces for the UE 110 served by the RN 120.

The T-DeNB 130*b* sends a handover request acknowledgement message to the T-RN-MME 140*b*. The message includes information of the RN 120 as the UE 110, that is, the information of the UE 110 included in the existing handover request acknowledgement message, for example, the eNB UE S1 AP ID, the MME UE S1 AP ID, the received E-RAB information and the failed E-RAB information.

The message includes information of the UE 110 served by the RN 120. The information of the UE 110 may include information as described below.

An eNB UE S1 APiD, and an MME UE S1 AP ID (allocated by the T-DeNB 130*b*) of the UE 110 in the RN and the T-DeNB interfaces.

E-RAB information of the UE 110, including the E-RAB identifier, and the uplink TEID and transport layer address allocated by the T-DeNB 130*b* for the UE 110 served by the RN 120 in the RN and the T-DeNB interfaces.

In operation 505*a*, the T-RN-MME 140*b* sends a UE context transfer message to the T-UE-MME 150*b*. The message includes context information of the UE 110 in the S-UE-MME 150*a* received in operation 402.

In operation 505*b*, the T-UE-MME 150*b* stores the context information of the UE 110. The T-RN-MME 140*b* sends a UE context transfer acknowledgement message to the T-RN-MME 140*b*.

Operations 505*a* and 505*b* are directed to each UE 110 served by the RN 120.

In operation 506, the T-RN-MME sends a forwarding re-location response message to the S-RN-MME 140*a*.

In operation 507, the S-RN-MME 140*a* sends a handover command message to the S-DeNB 130*a*. The message includes information of the RN 120 as the UE 110, that is, the information of the UE 110 included in the existing handover command message, for example, the eNB UE S1 AP ID and the MME UE S1 AP ID of the RN 120.

The message also includes information of the UE 110 served by the RN 120. The information of the UE 110 may include information as described below.

An eNB UE S1 AP ID and an MME UE S1 AP ID (allocated by the T-DeNB 130*b*) of the UE 110 in the RN and the T-DeNB interfaces.

The E-RAB information of the UE 110, including the E-RAB identifier, and the uplink TEID and transport layer address allocated by the T-DeNB 130*b* for the UE 110 served by the RN 120 in the RN and the T-DeNB interfaces.

Operations 508 to 510 are substantially the same as operations 405 to 507, and thus are not repeated here.

In operation 511, the T-DeNB 130*b* has a known target MME of each UE 110 served by the RN 120 from operation 503. For each UE 110 served by the RN 120, the T-DeNB 130*b* sends a path switch request message to the target MME of the UE 110. The message includes the eNB UE S1 AP ID of the UE 110 in the T-DeNB and the target MME interfaces, and the MME UE S1 AP ID of the source MME. The message includes E-RAB information to be switched in downlink. The message also includes the ECGI and the TAI of the target cell. The TAI includes a PLMN identifier selected by the S-DeNB 130*a* for the UE 110.

In operation 512*a*, the T-UE-MME 150*b* sends an update bearer request message to the S-GW/PDN GW 160 of the UE 110. The depiction about the signaling procedure between S-GW and PDN GW is omitted here. The message includes the downlink TEID and transport layer address allocated by the T-DeNB 130*b* for the UE 110. If the target PLMN re-selected for the UE 110 is different from the source PLMN, and the target PLMN is received from the source DeNB in operations 501 and 503, the T-UE-MME 150*b* sends a new TAI to the S-GW in the modification bearer request message, and the S-GW sends it to the PDN GW. The message may also include an ECGI. The PDN GW may perform reasonable billing for the UE 110 according to this information.

In operation 512*b*, the S-GW/PDN GW 160 of the UE 110 sends an update bearer response message to the T-UE-MME 150*b*.

In operation 513, the T-UE-MME 150*b* sends a path switch request acknowledgement message to the T-DeNB 130*b*.

In this embodiment, the resource of the UE 110 served by the RN 120 that is allocated under the RN 120 cell does not need to be re-configured. The handover process does not occur in the access layer from the UE end.

Embodiment Four

In the process of the movement of the RN 120, it is necessary to switch from a source base station S-DeNB 130*a* to a target base station T-DeNB 130*b*. This embodiment provides handover processes of the RN 120 and the UE 110, ensures the continuity of service of the UE 110 served by the RN 120 and reduces handover signaling.

This embodiment differs from embodiment two in that, in embodiment two, the S-RN-MME 140*a* selects the target MME for the UE 110 served by the RN 120. In this embodiment, the T-RN-MME 140*b* selects the target MME for the UE 110 served by the RN 120.

Figure 6:
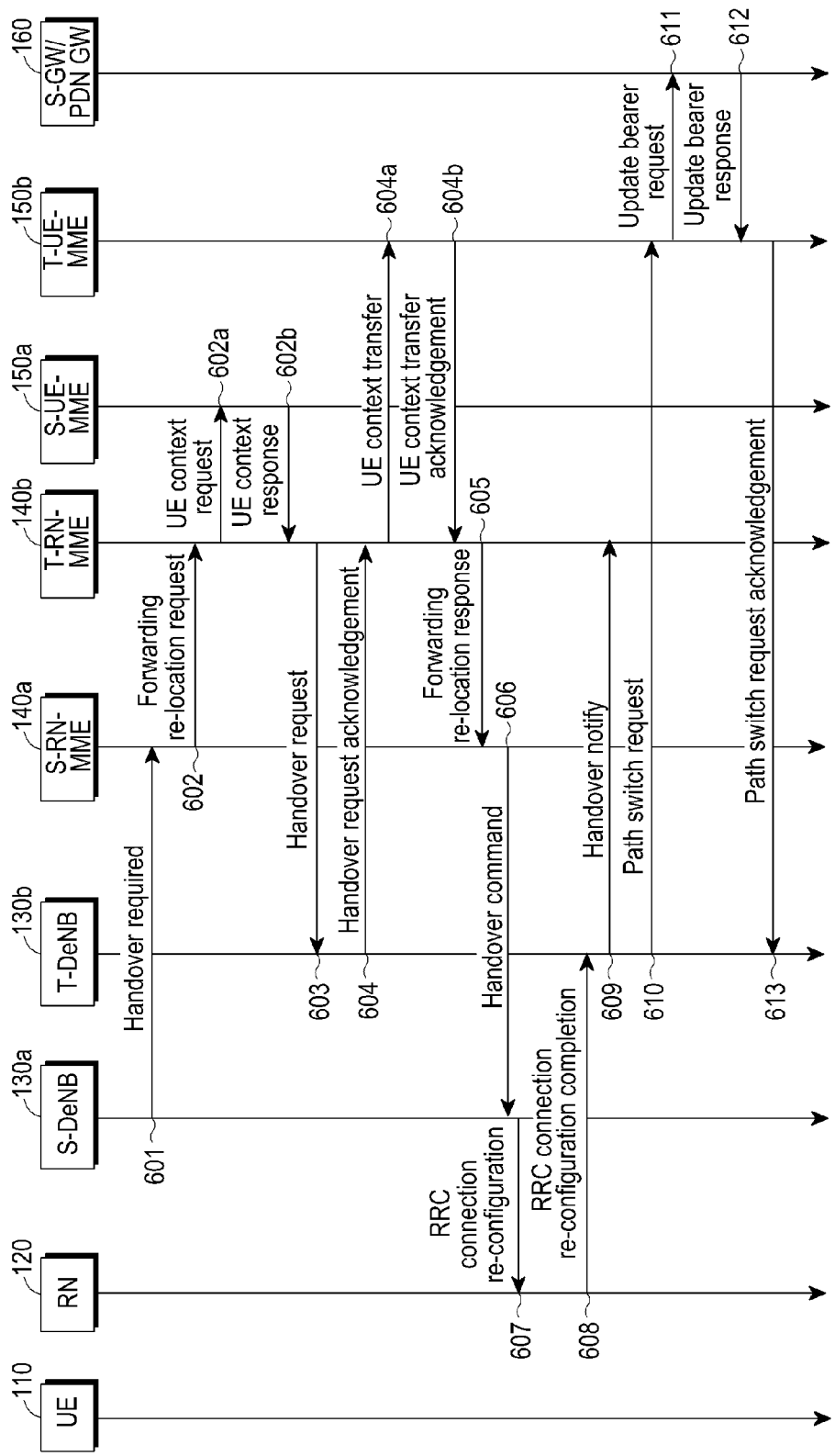
FIG. 6 is a flow diagram of supporting group handover according to an embodiment of the present disclosure.

FIG. 6 is a flow diagram of supporting group handover according to an embodiment of the present disclosure.

Referring to FIG. 6, operation 601 is the same as operation 501, and thus is not repeated here.

In operation 602, the S-RN-MME 140*a* sends a forwarding re-location request message to the T-RN-MME 140*b*. The message includes the information of the UE 110 served by the RN 120 in operation 601.

The T-MME selects the target MME for the UE 110 served by the RN 120. After the target MME is selected, it is necessary to transfer context information of the UE 110 in the source MME to the target MME. There are several methods to achieve transferring context of the UE 110.

In a first method, the T-RN-MME 140*b* requests the S-UE-MME 150*a* for the context information of the UE 110, and sends the context information of the UE 110 to the T-UE-MME 150*b*. The details are substantially the same as that in operations 602 and 604.

In a second method, the T-RN-MME 140*b* sends the selected T-UE-MME 150*b* to the S-UE-MME 150*a*, and the S-UE-MME 150*a* transfers the context of the UE 110 to the T-UE-MME 150*b*.

In a third method, the T-RN-MME 140*b* sends messages to the T-UE-MME 150*b*, and notifies the T-UE-MME 150*b* of information of the source UE-MME. The T-UE-MME 150*b* requests the S-UE-MME 150*a* for the context information of the UE 110.

In operation 602*a*, the T-RN-MME 140*b* sends a UE context request message to the S-UE-MME 150*a*. The message includes an eNB UE S1 AP ID and an MME UE S1 AP ID of the UE between the S-DeNB 130*a* and the MME.

In operation 602*b*, the S-UE-MME 150*a* sends a UE context response message to the T-RN-MME 140*b*. The message includes the context information of the UE 110.

Operations 603 to 604 are the same as operations 503 to 504 and thus are not repeated here.

In operation 604*a*, the T-RN-MME 140*b* sends a UE context transfer message to the T-UE-MME 150*b*. The message includes the context information of the UE 110 in the MME.

In operation 604*b*, the T-UE-MME 150*b* sends a UE context transfer acknowledgement message to the T-RN-MME 140*b*.

Operations 605 to 613 are the same as operations 506 to 513 and thus are not repeated here.

In this embodiment, the resource of the UE 110 served by the RN 120 that is allocated under the RN cell does not need to be re-configured. There is no handover process in the access layer from the UE end.

Embodiment Five

Figure 7:
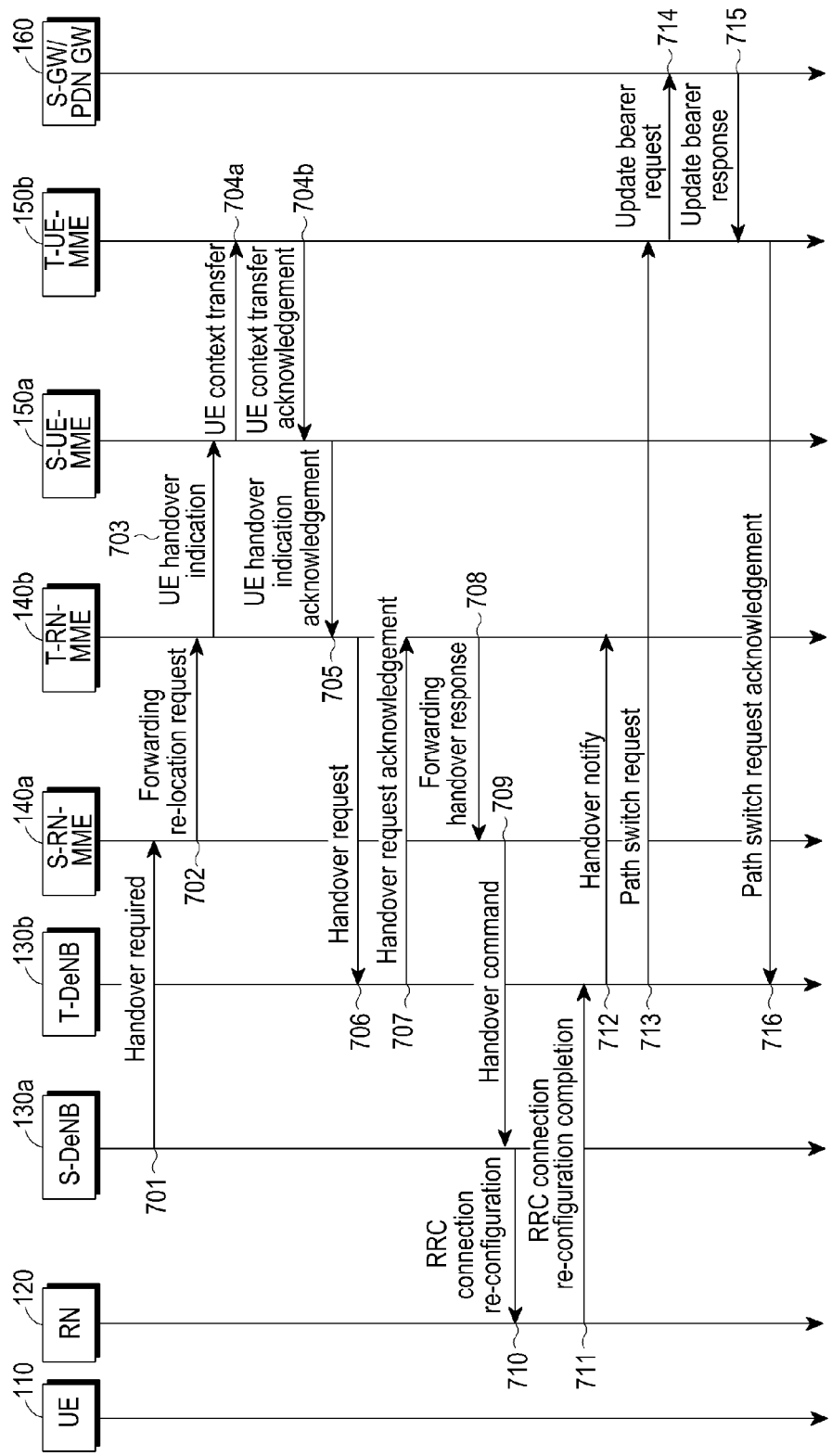
FIG. 7 is a flow diagram of supporting group handover according to an embodiment of the present disclosure.

FIG. 7 is a flow diagram of supporting group handover according to an embodiment of the present disclosure.

Referring to FIG. 7, in the process of the movement of the RN 120, it is necessary to switch from a source base station S-DeNB 130*a* to a target base station T-DeNB 130*b*. This embodiment provides handover processes of the RN 120 and the UE 110, ensures the continuity of the service of the UE 110 served by the RN 120 and reduces handover signaling. This embodiment differs from embodiment two in that, in embodiment two, the S-RN-MME 140*a* selects the target MME for the UE 110 served by the RN 120. In this embodiment, the S-UE-MME 150*a* selects the target MME for the UE 110 served by the RN 120.

Operations 701 to 702 are the same as operations 501 to 502 and thus are not repeated here.

In operation 703, the T-RN-MME 140*b* sends a UE handover indication message to the S-UE-MME 150*a*. The message includes an eNB UE S1 AP ID and an MME UE S1 AP ID of the UE 110 between the S-DeNB 130*a* and the MME. The message may also include the PLMN selected by the S-DeNB 130*a* for the UE 110.

In this embodiment, the S-RN-MME 140*a* may also send a UE handover indication message to the S-UE-MME 150*a* after the message of operation 701. The message includes the eNB UE S1 AP ID and the MME UE S1 AP ID of the UE between the S-DeNB 130*a* and the MME. The message also includes the PLMN selected by the S-DeNB 130*a* for the UE 110.

In operation 704*a*, the S-UE-MME 150*a* selects the target MME for the UE 110. The S-UE-MME 150*a* sends a UE context transfer message to the T-UE-MME 150*b*. The message includes the context information of the UE 110 in the MME.

In operation 704*b*, the T-UE-MME 150*b* sends a UE context transfer acknowledgement message to the S-UE-MME 150*a*.

In operation 705, the S-UE-MME 150*a* sends a UE handover indication acknowledgement message to the T-RN-MME 140*b*. If the UE handover indication is received from the S-RN-MME 140*a*, the response message is sent to the S-RN-MME 140*a*.

Operations 703 to 705 are directed to each UE 110 served by the RN 120.

Operations 706 to 707 are the same as operations 503 to 504 and thus are not repeated here.

Operations 708 to 716 are the same as operations 505 to 513 and thus are not repeated here.

In this embodiment, the resource of the UE 110 served by the RN 120 that is allocated under the RN cell does not need to be re-configured. There is no handover process in the access layer from the UE end.

Embodiment Six

Figure 8:
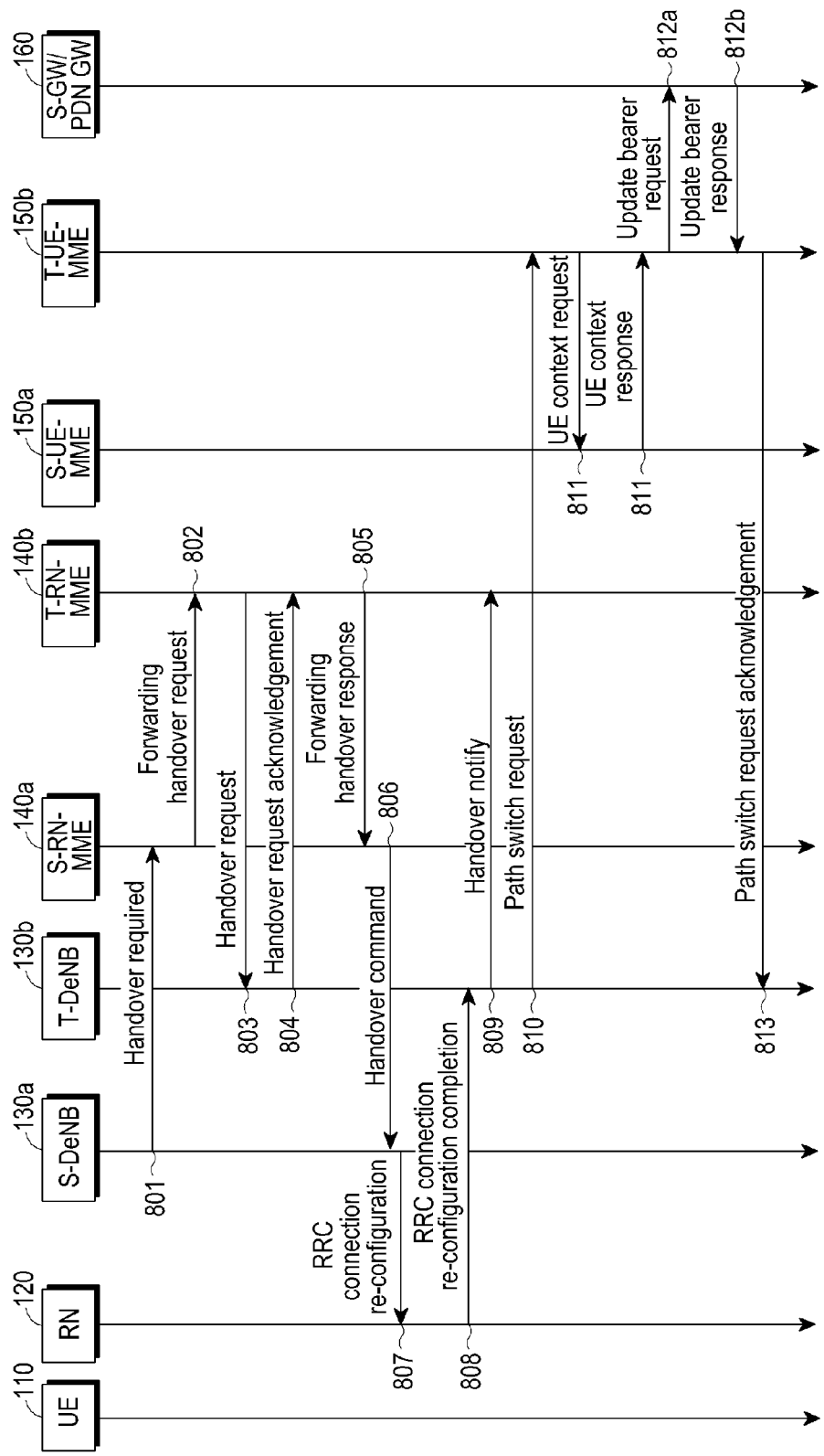
FIG. 8 is a flow diagram of supporting group handover according to an embodiment of the present disclosure.

FIG. 8 is a flow diagram of supporting group handover according to an embodiment of the present disclosure.

Referring to FIG. 8, in the process of movement of the RN 120, it is necessary to switch from a source base station S-DeNB 130*a* to a target base station T-DeNB 130*b*. This embodiment provides handover procedures of the RN 120 and the UE 110, ensures the continuity of service of the UE 110 served by the RN 120 and reduces handover signaling. This embodiment differs from embodiment two in that, in embodiment two, the S-RN-MME 140*a* selects a target MME for the UE 110 served by the RN 120. In this embodiment, the T-DeNB 130*b* selects the target MME for the UE 110 served by the RN 120.

Operations 801 to 802 are the same as operations 501 to 502 and thus are not repeated here.

Operations 803 to 809 are the same as operations 606 to 612 and thus are not repeated here.

In operation 810, the T-DeNB 130*b* selects the target MME for the UE 110 served by the RN 120. The T-DeNB 130*b* sends a path switch request message to the target MME of the UE 110. The message includes a source MME identifier of the UE 110. The message includes an eNB UE S1 AP ID and/or an MME UE S1 AP ID of the UE 110 in the S-DeNB and the S-UE-MME interfaces.

In operation 811, the T-UE-MME 150*b* sends a UE context request message to the S-UE-MME 150*a*. The message includes an eNB UE S1 AP ID and/or an MME UE S1 AP ID of the UE 110 in the S-DeNB and the S-UE-MME interfaces. The S-UE-MME 150*a* sends a UE context response message to the T-UE-MME 150*b*. The message includes the context information of the UE 110 in the MME.

Operations 812*a* to 813 are the same as operations 611 to 613 and thus are not repeated here.

In this embodiment, the resource of the UE 110 served by the RN 120 that is allocated under the RN cell does not need to be re-configured. There is no handover process in the access layer from the UE end.

Embodiment Seven

Figure 9:
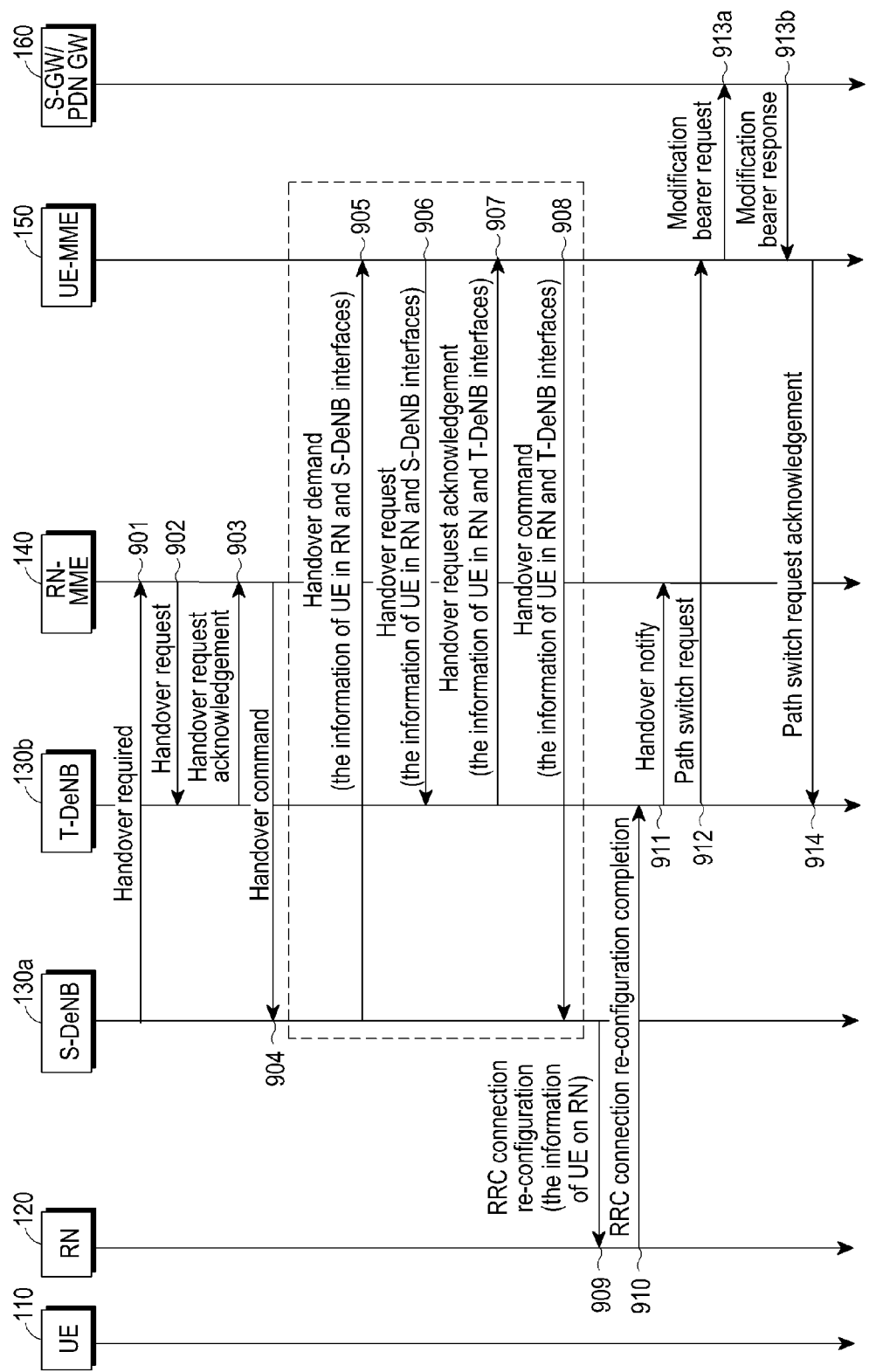
FIG. 9 is a flow diagram of supporting group handover according to an embodiment of the present disclosure.

FIG. 9 is a flow diagram of supporting group handover according to an embodiment of the present disclosure.

Referring to FIG. 9, in the process of movement of the RN 120, it is necessary to switch from a source base station S-DeNB 130*a* to a target base station T-DeNB 130*b*. This embodiment provides handover procedures of the RN 120 and the UE 110, ensures the continuity of service of the UE 110 served by the RN 120 and reduces handover signaling. This embodiment differs from embodiment one in that, in the application scene one, the handover preparation processes are directed to the RN 120 and all UEs served by the RN 120. In embodiment six, the handover preparation processes are performed separately for the RN 120 and each UE 110.

In operation 901, the source DeNB initiates the process of handover of the RN 120. The S-DeNB 130*a* sends a handover required message to the RN-MME 140.

In operation 902, the RN-MME 140 sends a handover request message to a target DeNB.

The source DeNB refers to the DeNB where the RN 120 is originally located, and the target DeNB refers to the DeNB where the RN 120 is to be switched to.

In operation 903, the target DeNB allocates resource for the RN 120 and sends a handover request acknowledgement message to the RN-MME 140.

In operation 904, the RN-MME 140 sends a handover command message to the source DeNB.

The source DeNB initiates handover process of the UE 110 served by the RN 120 at the network side. For each UE 110 served by the RN 120, operations 905 to 908 are repeated. The source DeNB may not need to trigger the handover process of another UE 110 after operation 908 is performed. And operation 905 is triggered by each UE 110 in turn. The source DeNB may also not need to perform handover process of the UE 110 served by the RN 120 until operation 904 but may perform a handover process for the UE 110 in turn after the sending operation 901.

In operation 905, the S-DeNB 130*a* sends a handover required message to the UE-MME 150. The message includes an eNB UE S1 AP ID, and an MME UE S1 AP ID of the UE 110 in the S1 interface between the RN 120 and the S-DeNB 130*a*. The message may also include the downlink TEID and transport layer address of the UE 110 allocated by the RN 120 in the RN and the S-DeNB interfaces.

The UE-MME 150 decides whether to re-select the S-GW for the UE 110. In the case of re-selecting, the UE-MME 150 sends a session creation request message to the target S-GW/PDN GW 160. The signaling procedure between the S-GW and the PDN GW is omitted here. In the case of re-selecting the S-GW, the PDN GW may not change. The target S-GW sends a session creation response message to the T-MME.

In operation 906, the UE-MME 150 sends a handover request message to the target DeNB. The message includes the downlink TEID and transport layer address of the UE 110 allocated by the RN in the RN and the DeNB interfaces. The message may also include the eNB UE S1 AP ID, and the MME UE S1 AP ID of the UE 110 in the S1 interface between the RN 120 and the S-DeNB 130*a*.

In operation 907, the target DeNB allocates the downlink TEID and transport layer address of the T-DeNB and the T-MME interfaces for the UE 110. The T-DeNB 130*b* allocates an uplink TEID and transport layer address of the RN and the T-DeNB interfaces for the UE 110. The T-DeNB 130*b* allocates the MME UE S1 AP ID of the RN and the T-DeNB interfaces for the UE 110 and sends a handover request acknowledgement message to the T-MME. The message includes the downlink TEID and transport layer address of the T-DeNB and the T-MME interfaces allocated for the UE 110. The message includes the uplink TEID and transport layer address of the RN and the T-DeNB interfaces allocated by the T-DeNB 130*b* for the UE 110. The message includes the MME UE S1 AP ID of the RN 120 and the T-DeNB interfaces allocated by the T-DeNB 130*b* for the UE 110.

In operation 908, the S-MME sends a handover command message to source DeNB. The message may include information as described below.

An eNB UE S1 AP ID and an MME UE S1 AP ID (allocated by the T-DeNB 130*b*) of the UE 110 in the RN and the T-DeNB interfaces.

E-RAB information of the UE 110, including an E-RAB identifier, and the uplink TEID and transport layer address of the RN and the T-DeNB interfaces allocated by the T-eNB for the UE 110 served by the RN 120.

The S-DeNB 130*a* performs operation 909 after receiving the message of operation 904 for switching the RN 120 and the message of operation 908 for switching all UEs served by the RN 120.

Operations 909 to 911 are the same as operations 707 to 709 and thus are not repeated here.

In operation 912, the T-DeNB 130*b* sends a handover notify message to the UE-MME 150. The T-DeNB 130*b* may send the message for the RN 120 and each UE 110 served by the RN 120 in turn.

In operation 913*a*, for each UE 110 served by the RN 120, the T-MME sends an update bearer request message to the S-GW/PDN GW 160 of the UE 110. If the S-GW is re-selected for the UE 110, the T-MME sends an update bearer request message to the target S-GW/PDN GW 160. The PDN GW may not change when the S-GW is re-selected, and the depiction about the signaling procedure between the S-GW and the PDN GW is omitted here. The message includes the downlink TEID and transport layer address allocated by the T-DeNB 130*b* for the UE 110. If the target PLMN re-selected for the UE 110 is different from the source PLMN, the UE-MME 150 sends a new TAI to the S-GW in the modification bearer request message, and the S-GW sends it to the PDN GW. The PDN GW may perform reasonable billing for the UE 110 according to this information.

For an architecture where the S-GW and the PDN GW of the RN 120 are single entities (i.e., the S-GW/PDN GW 160 are not co-located with the RN 120 at the same entity), the RN-MME 140 sends a modification bearer request message to the T-S-GW/PDN GW of the RN 120. The message includes information of the RN 120 as the UE 110.

In operation 913*b*, the T-S-GW/PDN GW of the RN 120 will send a modification bearer response message to the T-MME.

In operation 913, the S-GW/PDN GW 160 of the UE 110 sends a modification bearer response message to the UE-MME 150.

In operation 914, the UE-MME 150 sends a path switch request acknowledgement message to the T-DeNB 130*b*.

Another method for achieving embodiment seven includes switching all the UEs under the RN 120 in operations 905 to 908. As such, the information included in this message is a list of all UEs under one RN 120. The information of each UE 110 is the same as the above specific depiction. The process between the MME and the S-GW may be performed once for each UE 110, since the S-GW of each UE 110 may be different. If the S-GW of all UEs is the same, the process between the MME and the S-GW may also be performed once for all UEs under the RN 120. As such, the message includes the information of all UEs under the RN 120.

Embodiment Eight

Figure 10:
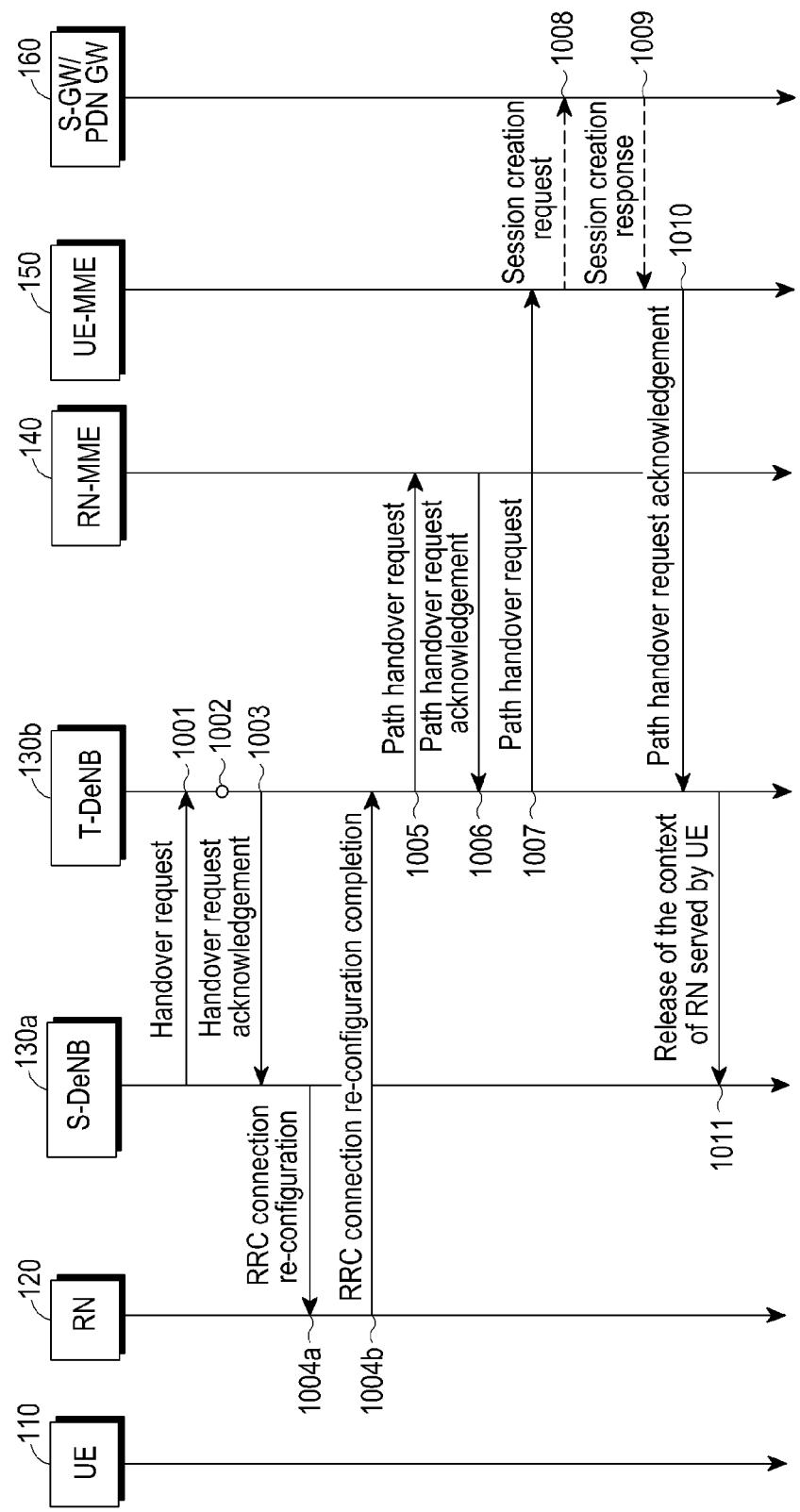
FIG. 10 is a flow diagram of supporting group handover according to an embodiment of the present disclosure.

FIG. 10 is a flow diagram of supporting group handover according to an embodiment of the present disclosure.

Referring to FIG. 10, in the process of movement of the RN 120, it is necessary to switch from a source base station S-DeNB 130*a* to a target base station T-DeNB 130*b*. This embodiment provides X2 handover procedures of the RN 120 and the UE 110, ensures the continuity of service of the UE 110 served by the RN 120, and reduces handover signaling.

In operation 1001, the S-DeNB 130*a* decides to initiate handover of the RN 120. The S-DeNB 130*a* also switches the UE 110 served by the RN 120 to the T-DeNB 130*b*. The S-DeNB 130*a* sends a handover request message to the T-DeNB 130*b*. The handover request message includes all the existing information of the RN 120 as the UE 110, that is, the information of the UE 110 included in the existing handover request message. The message also includes information of the UE 110 served by the RN 120. The information of the UE 110 may include information as described below.

An eNB UE S1 AP ID and an MME UE S1 AP ID of the UE 110 in the S1 interface between the RN 120 and the T-DeNB 130*b*.

An MME UE S1 AP ID of the UE 110 in the S1 interface between the S-DeNB 130*a* and the MME. It may also include the old eNB UE S1 AP ID of the UE 110 in the S1 interface between the S-DeNB 130*a* and the MME.

E-RAB information of the UE 110, such as the E-RAB identifier. It may also include the downlink TEID and transport layer address of the UE 110 allocated by the RN 120 in the RN and the S-DeNB interfaces.

The S-DeNB 130*a* selects the PLMN of the target service for each UE 110 according to a Handover Restriction List (HRL) of the UE 110 served by the RN 120, and the target PLMN selected for the UE 110 is included in the information of the UE 110, which may be a PLMN identifier, or may also be included in the selected TAI.

In operation 1002, the T-DeNB 130*b* allocates a wireless resource of a Un interface for the RN 120. The T-DeNB 130*b* allocates an uplink TEID and transport layer address of the RN and the T-DeNB interfaces allocated by the T-DeNB 130*b* for the UE 110 served by the RN 120. The T-DeNB 130*b* allocates the MME UE S1 AP ID of the RN and the T-DeNB interfaces for the UE 110 served by the RN 120.

In operation 1003, the T-DeNB 130*b* sends a handover request acknowledgement message to the S-DeNB 130*a*. The message includes information of the RN 120 as the UE 110, that is, the information of the UE 110 included in the existing handover request acknowledgement message, such as the old eNB UE X2 AP ID, the new eNB UE X2 AP ID, the received E-RAB information and the failed E-RAB information.

The message includes information of the UE 110 served by the RN 120. The information of the UE 110 may include information as described below.

An eNB UE S1 AP ID and an MME UE S1 AP ID (allocated by the T-DeNB 130*b*) of the UE 110 in the RN and the T-DeNB interfaces.

E-RAB information of the UE 110, including an E-RAB identifier, and an uplink TEID and transport layer address of the RN and the T-DeNB interfaces allocated by the T-eNB for the UE 110 served by the RN 120.

Operations 1004*a* to 1004*b* are the same as operations 405 to 406, and thus are not repeated here.

In operation 1005, the T-DeNB 130*b* allocates the downlink eNB UE S1 AP ID for the RN 120, and allocates the downlink TEID and transport layer address for the bearer of the RN 120. The T-DeNB 130*b* sends a path switch request message to the RN-MME 140. The message includes information of the RN 120 as the UE 110, that is, the information of the UE 110 included in the existing handover request message, such as, the eNB UE S1 AP ID, and the E-RAB list needed to be switched in downlink.

In operation 1006, the RN-MME 140 sends a path switch request acknowledgement message to the T-DeNB 130*b*.

In operation 1007, the T-DeNB 130*b* allocates the eNB UE S1 AP ID of the T-DeNB and the T-MME interfaces for the UE 110 served by the RN 120. The T-DeNB 130*b* allocates the downlink TEID and transport layer address of the T-DeNB and the T-MME interfaces for the UE 110 served by the RN 120. The T-DeNB 130*b* sends a path switch request message to the UE-MME 150.

The message also includes information of the UE 110 served by the RN 120, and the information of the UE 110 may include information as described below.

An eNB UE S1 AP ID of the UE 110 between the T-DeNB 130*b* and the MME, and the MME UE S1 AP ID of the UE 110 between the S-DeNB 130*a* and the MME.

E-RAB information of the UE 110 in the downlink handover, including an E-RAB identifier and a downlink TEID and transport layer address of the T-DeNB and the MME interfaces allocated by the T-DeNB 130*b*.

A target PLMN selected for the UE 110, which may be a PLMN identifier, or the target PLMN selected for the UE 110 that is included in the selected TAI.

In operation 1008, the MME determines whether it is necessary to re-locate the S-GW for the UE 110 served by the RN 120. For the UE 110 requiring to re-locate the S-GW, the MME sends a session creation request message to the T-S-GW/PDN GW of the UE 110. If the PDN GW requests position information of the UE 110, the MME includes position information of the UE 110, for example, the TAI is in said message. The TAI includes the PLMN identifier of the UE 110 at the target end. The PDN GW may perform reasonable billing for the UE 110. The T-S-GW/PDN GW sends a session creation response message to the MME.

For the UE 110 of the S-GW not requiring to re-locate the S-GW, the MME sends an update bearer request message to the S-GW/PDN GW of the UE 110. If the PDN GW requests position information of the UE 110, the MME includes position information of the UE 110, for example, the TAI is in said message. The TAI includes the PLMN identifier of the UE 110 at the target end. The PDN GW may perform reasonable billing for the UE 110.

In operation 1009, the S-GW/PDN GW 160 of the UE 110 sends a modification bearer response message to the MME.

For the architecture where the S-GW/PDN GW 160 of the RN 120 are single entities (i.e., the S-GW/PDN GW 160 are not co-located with the RN 120 at the same entity), the RN-MME 140 determines whether the S-GW of the RN 120 needs to be re-located. If it needs to be relocated, the message of operation 1008 is sent to the target S-GW of the RN 120, and then operation 1009 is performed. If it does not need to be relocated, the modification bearer request message is sent to the S-GW of the RN 120, and the S-GW of the RN 120 sends a modification bearer response message to the RN-MME 140.

In operation 1010, the UE-MME 150 sends a path switch request acknowledgement message. The message also includes the information of the UE 110 served by the RN 120. The information of the UE 110 may include information as described below.

An eNB UE S1 AP ID and an MME UE S1 AP ID of the UE 110 between the T-DeNB 130*b* and the MME.

E-RAB information requiring handover in the uplink, such as an E-RAB identifier, and an uplink TEID and transport layer address between the T-DeNB 130*b* and the MME.

E-RAB information required to be released.

In operation 1011, the T-DeNB 130*b* sends a UE context release message to the S-DeNB 130*a*. The message includes information of the RN 120 as the UE 110, such as the old eNB UE X2 AP ID and the new eNB UE X2 AP ID. The source DeNB releases the context information of the RN 120. The Source DeNB may also release the context information of the UE 110 served by the RN 120.

In embodiment eight, the resource of the UE 110 served by the RN 120 allocated under the RN 120 cell does not need to be re-configured. The handover process does not occur in the access layer from the UE end.

During the handover of the RN 120, if the information of the UE 110 changes, for example, the GUTI changes, there are two methods to notify the UE 110 of the change of related information.

First Method

In a first method, the MME (i.e., the target MME when MME re-location occurs) sends a UE information update to the UE through an NAS message, the NAS message including updated information, such as the GUTI. The updated information may also include a TAI list, and may also include an equivalent PLMN list.

The UE information update may be the existing GUTI re-allocation command.

The UE stores the above received information.

The UE sends the received acknowledgement message to MME. The received acknowledgement message, for example, is GUTI re-allocation completion. This step is an optional step.

Second Method

In a second method, the MME (i.e., the target MME if MME re-location occurs) sends a UE information update to the DeNB through an S1 message. The S1 message may send the information of all UEs under the RN to the RN. The message includes the information of each UE, such as the GUTI of the UE, and may also include a TAI list of the UE. The message may be sent via the associate signaling connection of RN.

The DeNB sends the UE information update to the RN through an S1 message. The message may send the information of all UEs under the RN to the RN. The message includes the information of each UE, such as the GUTI of the UE, and may also include a TAI list of the UE.

The RN sends the above received information of each UE to a corresponding UE through an RRC message.

Now, the description about informing the UE of the change of related information is completed.

A person having ordinary skill in the art may appreciate that all or part of the above described operations involved in the various embodiments may be completed through one or more program instructing relevant hardware. The program may be stored in a computer readable storage medium. The program may include one of the operations of the various embodiments or combination thereof when executed.

In addition, the respective functional units in the various embodiments of the present disclosure may be integrated in one processing module, each unit may independently and physically exist, or two or more units may be integrated in one module. The above integrated module may be carried out in the form of hardware, and in the form of a software functional module. When the integrated module is carried out in the form of a software functional module and is sold or used as an independent product, it may also be stored in a computer readable storage medium.

The above-mentioned storage medium may be read-only storage, disk or optical disk.

The foregoing is part of various embodiments of the present disclosure. It should be pointed out that a person having ordinary skills in the art may also make several improvements and modifications without deviating from the principle of the present disclosure, and these improvements and modifications should also be regarded as within the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of supporting a handover of a relay node (RN) connected with at least one user equipment (UE) in a wireless communication system, the method comprising:
   determining, using a processor of a source base station, to initiate a handover of the RN;
   transmitting, by the source base station, a handover request message including first information associated with the at least one UE to a mobility managing entity (MME) for managing mobility of the RN;
   receiving, by the source base station, from the MME a handover command including second information associated with the at least one UE by a handover preparation procedure for the RN which is performed from the source base station to a target base station based on the second information; and
   transmitting, by the source base station, a control message for radio resource control (RRC) re-configuration to the RN, the control message including the second information associated with the at least one UE,
   wherein the control message instructs that the handover of the RN is performed from the source base station to the target base station based on the second information.

2. The method of claim 1, wherein the first information further includes a UE context for each of the at least one UE, and is transmitted from the MME as a source MME to a target MME of the RN.

3. The method of claim 2, wherein the UE context is received from a MME for managing mobility of the at least one UE.

4. The method of claim 1, wherein the control message further includes information related to a user plane between the RN and the target base station and a signaling connection between the RN and the target base station for the at least one UE.

5. The method of claim 1, wherein the control message further includes an evolved-universal terrestrial radio access network (E-UTRAN) radio access bearer (E-RAB) identifier of the at least one UE, a downlink tunnel endpoint identifier (TEID) and a transport layer address allocated by the RN.

6. The method of claim 1, wherein the handover command further includes information related to a resource allocated for the at least one UE by the target base station.

7. The method of claim 1, wherein the control message further includes a UE identifier for each of the at least one UE.

8. A method of supporting a handover of a relay node (RN) connected with at least one user equipment (UE) in a wireless communication system, the method comprising:
   receiving, by a mobility managing entity (MME) for managing mobility of the RN, from a source base station a first handover request message including information associated with the at least one UE, the first handover request message for a handover of the RN;
   transmitting, by the MME, to a target base station a second handover request message including the information;
   generating, using a processor of the MME, a handover command including the information; and
   transmitting, by the MME, the handover command to the source base station, wherein the handover command instructs that the handover of the RN is performed from the source base station to the target base station based on the information.

9. The method of claim 8, wherein the second handover request message includes a UE context for each of the at least one UE, and the UE context is transmitted from a mobility managing entity (MME) for managing mobility of the at least one UE.

10. A base station for supporting a handover of a relay node (RN) connected with at least one user equipment (UE) in a wireless communication system, the base station comprising:
 a processor is configured to:
  determine to initiate a handover of the RN,
  transmit a handover request message including first information associated with the at least one UE to a mobility managing entity (MME) for managing mobility of the RN,
  receive from the MME a handover command including second information associated with the at least one UE by a handover preparation procedure for the RN is performed from the source base station to a target base station based on the second information, and
  transmit a control message for radio resource control (RRC) re-configuration to the RN, the control message including the second information associated with the at least one UE,
 wherein the control message instructs that the handover of the RN is performed from the source base station to the target base station based on the second information.

11. The base station of claim 10, wherein the first information further includes a UE context for each of the at least one UE, and is transmitted from the MME as a source MME to a target MME of the RN.

12. The base station of claim 11, wherein the UE context is received from a MME for managing mobility of the at least one UE.

13. The base station of claim 10, wherein the control message further includes information related to a user plane between the RN and the target base station and a signaling connection between the RN and the target base station for the at least one UE.

14. The base station of claim 10, wherein the control message further includes an evolved-universal terrestrial radio access network (E-UTRAN) radio access bearer (E-RAB) identifier of the at least one UE, a downlink tunnel endpoint identifier (TEID) and a transport layer address allocated by the RN.

15. The base station of claim 10, wherein the handover command further includes information related to a resource allocated for the at least one UE by the target base station.

16. The base station of claim 10, wherein the control message further includes a UE identifier for each of the at least one UE.

17. A mobility managing entity (MME) for managing mobility of the RN and supporting a handover of a relay node (RN) connected with at least one user equipment (UE) in a wireless communication system, the MME comprising:
 a processor is configured to:
  receive from a source base station a first handover request message including information associated with the at least one UE, the first handover request message for the handover of the RN,
  transmit to a target base station a second handover request message including the information;
  generate a handover command including the information; and
  transmit the handover command to the source base station,
 wherein the handover command instructs that the handover of the RN is performed from the source base station to the target base station based on the information.

18. The MME of claim 17, wherein the second handover request message includes a UE context for each of the at least one UE, and the UE context is transmitted from a mobility managing entity (MME) for managing mobility of the at least one UE.

\* \* \* \* \*